US011094045B2

(12) United States Patent
Yang et al.

(10) Patent No.: US 11,094,045 B2
(45) Date of Patent: Aug. 17, 2021

(54) SYSTEMS AND METHODS FOR IMAGE PROCESSING

(71) Applicant: ZHEJIANG DAHUA TECHNOLOGY CO., LTD., Zhejiang (CN)

(72) Inventors: Changjiu Yang, Hangzhou (CN); Xiaotao Jiang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 30 days.

(21) Appl. No.: 16/219,907

(22) Filed: Dec. 13, 2018

(65) Prior Publication Data

US 2019/0164263 A1    May 30, 2019

Related U.S. Application Data

(63) Continuation of application No. PCT/CN2017/089192, filed on Jun. 20, 2017.

(30) Foreign Application Priority Data

Jun. 21, 2016 (CN) .......................... 201610456890.6
Jan. 11, 2017 (CN) .......................... 201710021180.5

(51) Int. Cl.
*G06K 9/40* (2006.01)
*G06T 5/10* (2006.01)
*G06T 5/00* (2006.01)

(52) U.S. Cl.
CPC .............. *G06T 5/10* (2013.01); *G06T 5/007* (2013.01); *G06T 2207/10016* (2013.01);
(Continued)

(58) Field of Classification Search
None
See application file for complete search history.

(56) References Cited

U.S. PATENT DOCUMENTS 6,266,102 B1 *  7/2001  Azuma .................. H04N 5/202
                                                348/252
6,829,778 B1    12/2004  Dagtas
(Continued)

FOREIGN PATENT DOCUMENTS

CN          101980521 A     2/2011
CN          104021531 A     9/2014
(Continued)

OTHER PUBLICATIONS

Ji Won Lee et al, Noise reduction and adaptive contrast enhancement for local tone mapping, IEEE Translations on Consumer Electronics, vol. 58, No. 2, May 2012.
(Continued)

*Primary Examiner* — Feng Niu
(74) *Attorney, Agent, or Firm* — Metis IP LLC

(57) ABSTRACT

According to aspects of the present disclosure, methods, systems, and media for processing an image are provided. A system may include at least one computer-readable storage medium including a set of instructions for processing an original image, and at least one processor in communication with the at least one computer-readable storage medium. When executing the set of instructions, the system is directed to obtain a first luminance image of the original image; decompose the first luminance image to provide a plurality of first decomposed images; adjust pixel frequencies in at least some of the plurality of first decomposed images to generate a plurality of second decomposed images; generate a second luminance image of the original image based on the plurality of second decomposed images;
(Continued)

and determine a final image of the original image based on the first luminance image, the second luminance image, and the original image.

5 Claims, 26 Drawing Sheets

(52) U.S. Cl.
CPC ............... *G06T 2207/10024* (2013.01); *G06T 2207/20024* (2013.01); *G06T 2207/20064* (2013.01); *G06T 2207/20076* (2013.01)

(56) References Cited

U.S. PATENT DOCUMENTS

| | | | | |
|---|---|---|---|---|
| 7,424,148 | B2* | 9/2008 | Goh | G06T 5/009 382/169 |
| 7,616,811 | B2* | 11/2009 | Kalevo | G06T 5/009 382/162 |
| 7,684,640 | B2* | 3/2010 | Zhao | G06T 3/40 382/274 |
| 7,796,830 | B2* | 9/2010 | Bilcu | H04N 9/0451 382/274 |
| 8,310,726 | B2* | 11/2012 | Enjuji | H04N 1/628 358/3.01 |
| 8,422,815 | B2* | 4/2013 | Ikebe | H04N 1/4074 382/274 |
| 8,542,944 | B2* | 9/2013 | Sun | G06K 9/40 382/275 |
| 8,849,056 | B2* | 9/2014 | Wakazono | G06T 5/002 382/261 |
| 8,885,105 | B1* | 11/2014 | Cheng | G06T 5/008 348/679 |
| 9,095,273 | B2* | 8/2015 | Shmatukha | G06T 7/0016 |
| 9,218,652 | B2* | 12/2015 | Humphrey | G09G 5/10 |
| 9,324,137 | B2 | 4/2016 | Huang | |
| 9,367,901 | B2* | 6/2016 | Omi | G06T 5/003 |
| 9,384,538 | B2* | 7/2016 | Humphrey | G06T 7/0002 |
| 9,454,810 | B2* | 9/2016 | Valdes Lopez | H04N 1/4074 |
| 9,460,499 | B2* | 10/2016 | McLaughlin | G06T 5/40 |
| 9,704,225 | B2* | 7/2017 | Du | G06T 5/20 |
| 9,710,715 | B2* | 7/2017 | Kikuchi | G06T 5/008 |
| 9,747,676 | B2* | 8/2017 | Humphrey | G06T 5/20 |
| 9,870,606 | B2* | 1/2018 | Bordes | H04N 19/51 |
| 9,911,182 | B2* | 3/2018 | McLaughlin | G06T 3/40 |
| 9,953,404 | B2* | 4/2018 | Humphrey | G06T 5/40 |
| 9,984,445 | B2* | 5/2018 | Valdes Lopez | H04N 1/4074 |
| 10,223,776 | B2* | 3/2019 | McLaughlin | G06T 5/50 |
| 2005/0123211 | A1* | 6/2005 | Wong | H04N 5/3675 382/254 |
| 2005/0163368 | A1* | 7/2005 | Hanamoto | G06T 5/40 382/162 |
| 2005/0254721 | A1 | 11/2005 | Hagiwara | |
| 2006/0153446 | A1* | 7/2006 | Oh | G06T 5/009 382/169 |
| 2007/0248265 | A1* | 10/2007 | Lundstrom | G06T 5/40 382/168 |
| 2009/0129671 | A1* | 5/2009 | Hu | G06T 7/136 382/173 |
| 2010/0092102 | A1 | 4/2010 | Sun | |
| 2010/0278423 | A1* | 11/2010 | Itoh | G06T 5/40 382/169 |
| 2011/0164828 | A1* | 7/2011 | Iwata | G06T 5/40 382/274 |
| 2011/0268358 | A1* | 11/2011 | Ikebe | G06T 5/008 382/172 |
| 2014/0112595 | A1 | 4/2014 | Huang | |
| 2015/0010250 | A1 | 1/2015 | Omi | |
| 2016/0005253 | A1* | 1/2016 | Yamamoto | G06K 9/2018 382/140 |
| 2016/0042502 | A1 | 2/2016 | Du et al. | |
| 2017/0171446 | A1* | 6/2017 | Nashizawa | H04N 5/2355 |
| 2018/0336669 | A1* | 11/2018 | Mertens | H04N 5/445 |
| 2018/0374203 | A1* | 12/2018 | Xiao | G06K 9/6212 |

FOREIGN PATENT DOCUMENTS

| | | |
|---|---|---|
| CN | 104504721 A | 4/2015 |
| CN | 105376498 A | 3/2016 |
| CN | 106097286 A | 11/2016 |
| CN | 106780400 A | 5/2017 |

OTHER PUBLICATIONS

First Office Action in Chinese application No. 201710021180.5 dated Apr. 22, 2019, 12 pages.
Extended European Search Report in European Application No. 17814700.5 dated Mar. 21, 2019, 6 pages.
International Search Report in PCT/CN2017/089192 dated Sep. 21, 2017, 6 pages.
Written Opinion in PCT/CN2017/089192 dated Sep. 21, 2017, 6 pages.
First Office Action in Chinese Application No. 201610456890.6 dated May 3, 2018, 13 pages.

\* cited by examiner

800

- Identifying a particular number of pixels that are located at a same position from one or more first decomposed images of the plurality of the first decomposed images — 810
- Determining the frequencies of the identified pixels — 820
- Filtering frequencies of the identified pixels to obtain the particular number of filtered frequencies — 830
- Determining the average filtered frequency associated with the position based on the particular number of filtered frequencies — 840
- Determining a gain associated with the position based on the average filtered frequency — 850

FIG. 8

| a1 | a2 |
|----|----|
| a3 | a4 |

FIG. 10-I

| b1 | b2 |
|----|----|
| b3 | b4 |

FIG. 10-II

| c1 | c2 |
|----|----|
| c3 | c4 |

FIG. 10-III

1100

Identifying a position of an original pixel in the original image — 1110

Determining a first luminance of a pixel in the first luminance image, the pixel in the first luminance image being at the same position as the original pixel in the original image — 1120

Determining a second luminance of a pixel in the second luminance image, the pixel in the second luminance image being at the same position as the original pixel in the original image — 1130

Determining a final pixel associated with the original pixel based on the first luminance and the second luminance — 1140

Determining a final image of the original image based on the final pixel — 1150

FIG. 11

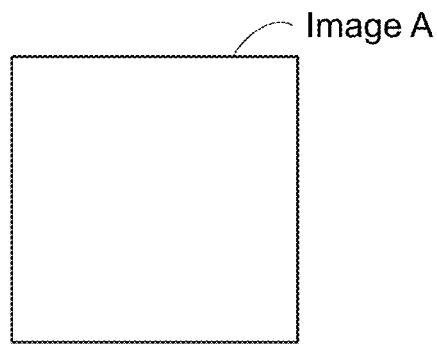
FIG. 14-I
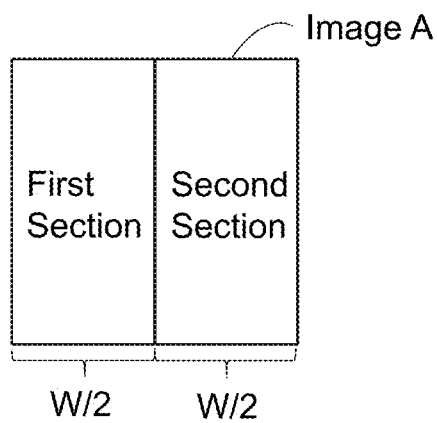
FIG. 14-II
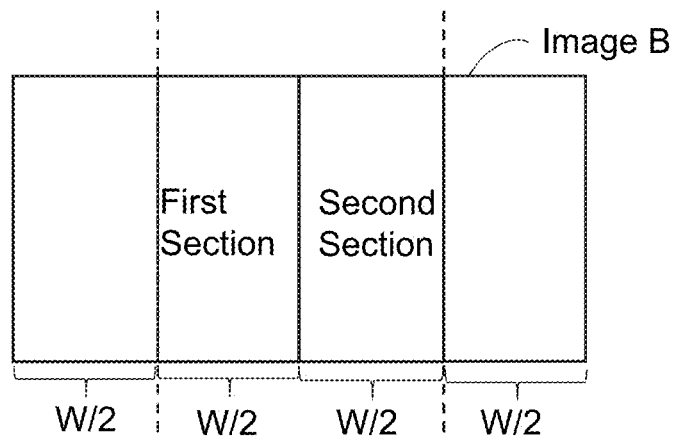
FIG. 14-III

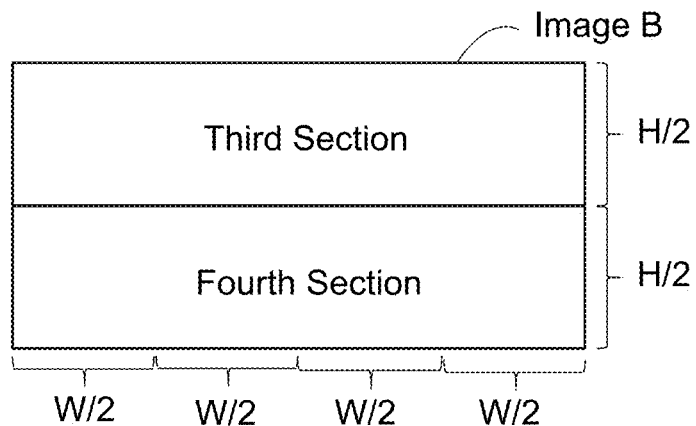
FIG. 14-IV
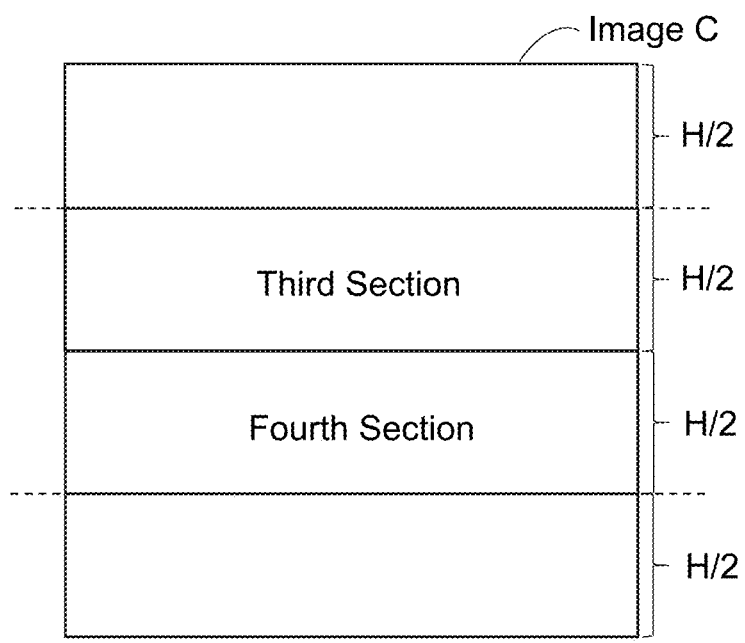
FIG. 14-V

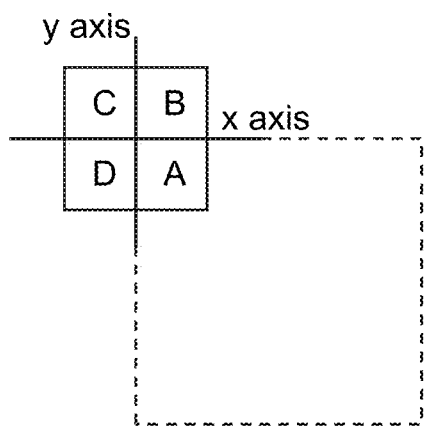
FIG. 15-I
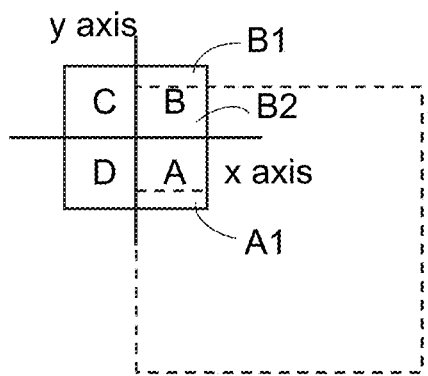
FIG. 15-II

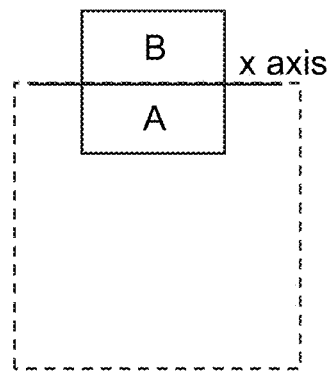
FIG. 15-III
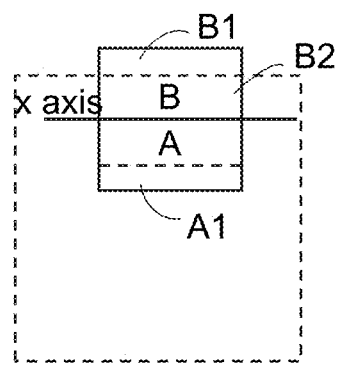
FIG. 15-IV
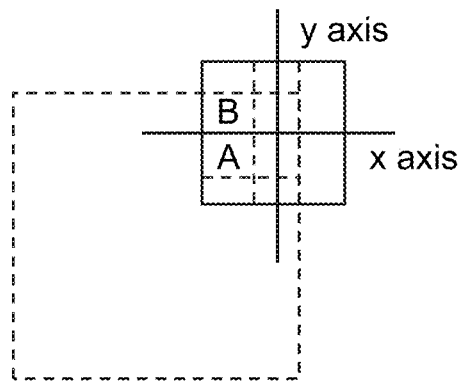
FIG. 15-V

1600

Determining a plurality of optimal coefficients, an optimal coefficient being associated with a statistical probability of the plurality of statistical probabilities relating to a target region — 1610

Determining a plurality of optimal curves, an optimal curve being associated with an optimal coefficient of the plurality of optimal coefficients — 1620

Identifying a plurality of predetermined curves associated with the plurality of optimal coefficients — 1630

Determining a mapping curve of the target region based on the plurality of optimal curves and the plurality of predetermined curves — 1640

For each gray level of the plurality of gray levels in a target region, determining a sub mapping curve associated with the gray level based on an optimal curve associated with the gray level and a predetermined curve associated with the gray level — 1910

Determining a mapping curve based on the plurality of the sub mapping curves associated with the plurality of gray levels — 1920

```
┌─────────────────────────────────────┐
│ Obtaining a first luminance image   │──── 2310
│ of an original image                │
└─────────────────────────────────────┘
                  ↓
┌─────────────────────────────────────┐
│ Decomposing the first luminance     │
│ image of the original image to      │──── 2320
│ obtain a plurality of first         │
│ decomposed images                   │
└─────────────────────────────────────┘
                  ↓
┌─────────────────────────────────────┐
│ Determining a plurality of second   │
│ decomposed images based on the      │──── 2330
│ plurality of first decomposed       │
│ images                              │
└─────────────────────────────────────┘
                  ↓
┌─────────────────────────────────────┐
│ Reconstructing a second luminance   │
│ image of the original image based   │──── 2340
│ on the plurality of second          │
│ decomposed images                   │
└─────────────────────────────────────┘
                  ↓
┌─────────────────────────────────────┐
│ Determining a final image of the    │
│ original image based on the first   │──── 2350
│ luminance image, the second         │
│ luminance image and the original    │
│ image                               │
└─────────────────────────────────────┘
                  ↓
┌─────────────────────────────────────┐
│ Identifying a target region in the  │
│ final image and a plurality of      │──── 2360
│ gray levels in the target region    │
└─────────────────────────────────────┘
                  ↓
┌─────────────────────────────────────┐
│ Determining a plurality of          │
│ statistical probabilities, a        │
│ statistical probability is          │──── 2370
│ associated with a gray level of     │
│ the plurality of gray levels        │
└─────────────────────────────────────┘
                  ↓
┌─────────────────────────────────────┐
│ Determining a mapping curve of the  │
│ target region based on the          │
│ plurality of statistical            │──── 2380
│ probabilities and a plurality of    │
│ predetermined curves associated     │
│ with the plurality of gray          │
│ levels                              │
└─────────────────────────────────────┘
                  ↓
┌─────────────────────────────────────┐
│ Identifying at least one pixel      │──── 2390
│ that needs to be processed in the   │
│ target region                       │
└─────────────────────────────────────┘
                  ↓
┌─────────────────────────────────────┐
│ Determining the value of the at     │
│ least one pixel that needs to be    │──── 2395
│ processed based on the mapping      │
│ curve of the target region          │
└─────────────────────────────────────┘
```

FIG. 23

SYSTEMS AND METHODS FOR IMAGE PROCESSING

This application is a continuation of International Application No. PCT/CN2017/089192, filed on Jun. 20, 2017, which claims priority to Chinese Patent Application No. 201610456890.6, filed on Jun. 21, 2016 and Chinese Patent Application No. 201710021180.5, filed on Jan. 11, 2017, the contents of which are hereby incorporated by reference.

TECHNICAL FIELD

The present disclosure relates to a technical field of image processing, and more particularly, systems and methods for image processing.

BACKGROUND

In general, a display device usually may display some of the luminance in nature. An image displayed on a display device may appear over exposed in a bright area and under exposed in a dark area, rendering it difficult to distinguish some details in the image. Systems and methods for image processing, which may generate images with more details and stronger contrast are widely welcome and in high demand.

SUMMARY

According to an aspect of the present disclosure, a system may include at least one computer-readable storage medium including a set of instructions for processing an original image, and at least one processor in communication with the at least one computer-readable storage medium. When executing the set of instructions, the system may be directed to: obtain a first luminance image of the original image; decompose the first luminance image of the original image to provide a plurality of first decomposed images; adjust pixel frequencies in at least some of the plurality of first decomposed images to generate a plurality of second decomposed images; generate a second luminance image of the original image based on the plurality of second decomposed images; and determine a final image of the original image based on the first luminance image, the second luminance image, and the original image.

In some embodiments, to adjust pixel frequencies in at least some of the plurality of first decomposed images, the system may be further directed to: for a specific pixel in a first decomposed image, identify a frequency of the specific pixel; determine a gain of the specific pixel based on the frequency of the specific pixel and a frequency adjustment threshold associated with the first decomposed image; and adjust the frequency of the specific pixel based on the gain of the specific pixel.

In some embodiments, to determine a gain of the specific pixel, the system may be further directed to: identify, from the plurality of the first decomposed images, a certain number of pixels each of which is located at a position corresponding to the specific pixel of the first decomposed images; determine the frequencies of the identified certain number of pixels, a pixel of the certain number of pixels having a frequency; filter the certain number of frequencies to obtain a plurality of filtered frequencies; determine an average filtered frequency associated with the position based on the plurality of filtered frequencies; determine the gain associated with the position based on the average filtered frequency; and assign the gain associated with the position to the specific pixel.

In some embodiments, to determine the final image of the original image based on the first luminance image, the second luminance image, and the original image, the system may be further directed to: for an original pixel of a plurality of original pixels in the original image, identify the position of the original pixel in the original image; determine a first luminance of a pixel in the first luminance image, the pixel in the first luminance image being at the same position as the original pixel in the original image; determine a second luminance of a pixel in the second luminance image, the pixel in the second luminance image being at the same position as the original pixel in the original image; and determine a final pixel associated with the original pixel based on the first luminance and the second luminance; and generate the final image of the original image based on the determined final pixels associated with the plurality of original pixels.

In some embodiments, to obtain the plurality of first decomposed images, the system may be further directed to perform one or more orders of decomposition on the first luminance image.

In some embodiments, the one or more orders of decomposition may be performed based on a wavelet transformation.

In some embodiments, to reconstruct a second luminance image of the original image based on the plurality of second decomposed images, the system may be further directed to: perform a reverse operation of the decomposition that provides the plurality of first decomposed images.

According to an aspect of the present disclosure, a system may include at least one computer-readable storage medium including a set of instructions for processing an image, and at least one processor in communication with the computer-readable storage medium. When executing the set of instructions, the system may be directed to: identify a target region in the image, the target region having a plurality of gray levels; determine a plurality of statistical probabilities relating to the plurality of gray levels, a statistical probability relating to a gray level of the plurality of gray levels; determine a mapping curve of the target region based on the plurality of statistical probabilities and a plurality of predetermined curves associated with the plurality of gray levels; identify at least one pixel that needs to be processed in the target region; for a pixel of the at least one pixels that needs to be processed, determine the value of the pixel based on the mapping curve of the target region; and generate a processed image based on the determined at least one value of the at least one pixel.

In some embodiments, to determine the mapping curve of the target region, the system may be further directed to: determine a plurality of optimal coefficients relating to the plurality of statistical probabilities, an optimal coefficient being associated with a statistical probability of the plurality of statistical probabilities relating to the target region; determine a plurality of optimal curves, an optimal curve being associated with an optimal coefficient of the plurality of optimal coefficients; and determine the mapping curve of the target region based on the plurality of optimal curves and the plurality of predetermined curves.

In some embodiments, to determine the plurality of optimal coefficients, the system may be further directed to: for a statistical probability of the plurality of statistical probabilities, determine an initial coefficient associated with the statistical probability based on the gray level associated with the statistical probability; identify a central pixel of the target region; and determine an optimal coefficient corresponding to the initial coefficient based on the central pixel of the target region.

In some embodiments, to determine the mapping curve of the target region based on the plurality of optimal curves and the plurality of predetermined curves, the system may be further directed to: for a gray level of the plurality of gray levels in the target region, determine a sub mapping curve associated with the gray level based on an optimal curve associated with the gray level and a predetermined curve associated with the gray level; and determine the mapping curve of the target region based on the plurality of the sub mapping curves associated with the plurality of gray levels.

In some embodiments, the image may include at least one target region.

According to an aspect of the present disclosure, a method for processing an original image may comprise: obtaining a first luminance image of the original image; decomposing the first luminance image of the original image to provide a plurality of first decomposed images; adjusting pixel frequencies in at least some of the plurality of first decomposed images to generate a plurality of second decomposed images; generating a second luminance image of the original image based on the plurality of second decomposed images; and determining a final image of the original image based on the first luminance image, the second luminance image, and the original image.

In some embodiments, the adjusting pixel frequencies in at least some of the plurality of first decomposed images may comprise: for a specific pixel in a first decomposed image, identifying a frequency of the specific pixel; determining a gain of the specific pixel based on the frequency of the specific pixel and a frequency adjustment threshold associated with the first decomposed image; and adjusting the frequency of the specific pixel based on the gain of the specific pixel.

In some embodiments, the determining a gain of the specific pixel may comprise: identifying from the plurality of the first decomposed images, a certain number of pixels that are located at a position corresponding to the specific pixel of the first decomposed images; determining the frequencies of the identified certain number of pixels, a pixel of the certain number of pixels having a frequency; filtering the certain number of frequencies to obtain a plurality of filtered frequencies; determining an average filtered frequency associated with the position based on the plurality of filtered frequencies; determining the gain associated with the position based on the average filtered frequency; and assigning the gain associated with the position to the specific pixel.

In some embodiments, the determining the final image of the original image based on the first luminance image, the second luminance image, and the original image may comprise: for an original pixel of a plurality of original pixels in the original image, identifying the position of the original pixel in the original image; determining a first luminance of a pixel in the first luminance image, the pixel in the first luminance image being at the same position as the original pixel in the original image; determining a second luminance of a pixel in the second luminance image, the pixel in the second luminance image being at the same position as the original pixel in the original image; and determining a final pixel associated with the original pixel based on the first luminance and the second luminance; and generating the final image of the original image based on the determined final pixels associated with the plurality of original pixels.

In some embodiments, the obtaining the plurality of first decomposed images may comprise performing one or more orders of decomposition on the first luminance image.

In some embodiments, the one or more orders of decomposition may be performed based on a wavelet transformation.

In some embodiments, the reconstructing a second luminance image of the original image based on the plurality of second decomposed images may comprise performing a reverse operation of the decomposition that provides the plurality of first decomposed images.

According to an aspect of the present disclosure, a method for processing an image may comprise: identifying a target region in the image, the target region having a plurality of gray levels; determining a plurality of statistical probabilities relating to the plurality of gray levels, a statistical probability relating to a gray level of the plurality of gray levels; determining a mapping curve of the target region based on the plurality of statistical probabilities and a plurality of predetermined curves associated with the plurality of gray levels; identifying at least one pixel that needs to be processed in the target region; for a pixel of the at least one pixels that needs to be processed, determining the value of the pixel based on the mapping curve of the target region; and generating a processed image based on the determined at least one value of the at least one pixel.

In some embodiments, the determining the mapping curve of the target region may comprise: determining a plurality of optimal coefficients relating to the plurality of statistical probabilities, an optimal coefficient being associated with a statistical probability of the plurality of statistical probabilities relating to the target region; determining a plurality of optimal curves, an optimal curve being associated with an optimal coefficient of the plurality of optimal coefficients; and determining the mapping curve of the target region based on the plurality of optimal curves and the plurality of predetermined curves.

In some embodiments, the determining the plurality of optimal coefficients may comprise: for a statistical probability of the plurality of statistical probabilities, determining an initial coefficient associated with the statistical probability based on the gray level associated with the statistical probability; identifying a central pixel of the target region; and determining an optimal coefficient corresponding to the initial coefficient based on the central pixel of the target region.

In some embodiments, the determining the mapping curve of the target region based on the plurality of optimal curves and the plurality of predetermined curves may comprise: for a gray level of the plurality of gray levels in the target region, determining a sub mapping curve associated with the gray level based on an optimal curve associated with the gray level and a predetermined curve associated with the gray level; and determining the mapping curve of the target region based on the plurality of the sub mapping curves associated with the plurality of gray levels.

In some embodiments, the image may include at least one target region.

According to an aspect of the present disclosure, a non-transitory computer readable medium may comprise at least one set of instructions for processing an original image, wherein when executed by at least one processor, the at least one set of instructions may direct the at least one processor to perform acts of: obtaining a first luminance image of the original image; decomposing the first luminance image of the original image to provide a plurality of first decomposed images; adjusting pixel frequencies in at least some of the plurality of first decomposed images to generate a plurality of second decomposed images; generating a second luminance image of the original image based on the plurality of second decomposed images; and determining a final image of the original image based on the first luminance image, the second luminance image, and the original image.

According to an aspect of the present disclosure, a non-transitory computer readable medium may comprise at least one set of instructions for processing an original image, wherein when executed by at least one processor, the at least one set of instructions may direct the at least one processor to perform acts of: identifying a target region in the image, the target region having a plurality of gray levels; determining a plurality of statistical probabilities relating to the plurality of gray levels, a statistical probability relating to a gray level of the plurality of gray levels; determining a mapping curve of the target region based on the plurality of statistical probabilities and a plurality of predetermined curves associated with the plurality of gray levels; identifying at least one pixel that needs to be processed in the target region; for a pixel of the at least one pixel that needs to be processed, determining the value of the pixel based on the mapping curve of the target region; and generating a processed image based on the determined at least one value of the at least one pixel.

According to an aspect of the present disclosure, a system may include: at least one acquisition module configured to obtain a first luminance image of the original image; at least one decomposition module configured to decompose the first luminance image of the original image to provide a plurality of first decomposed images; at least one frequency adjustment module configured to adjust pixel frequencies in at least some of the plurality of first decomposed images to generate a plurality of second decomposed images; at least one reconstruction module configured to generate a second luminance image of the original image based on the plurality of second decomposed images; and at least one determination module configured to determine a final image of the original image based on the first luminance image, the second luminance image, and the original image.

According to still an aspect of the present disclosure, a system may include at least one acquisition module and at least one determination module. The at least one acquisition module may be configured to: identify a target region in the image, the target region having a plurality of gray levels; and determine a plurality of statistical probabilities relating to the plurality of gray levels, a statistical probability relating to a gray level of the plurality of gray levels. The at least one determination module may be configured to: determine a mapping curve of the target region based on the plurality of statistical probabilities and a plurality of predetermined curves associated with the plurality of gray levels; identify at least one pixel that needs to be processed in the target region; for a pixel of the at least one pixel that needs to be processed, determine the value of the pixel based on the mapping curve of the target region; and generate a processed image based on the determined at least one value of the at least one pixel.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 8 is a flowchart illustrating an exemplary process for determining a gain of a pixel in a decomposed image according to some embodiments of the present disclosure;

FIGS. 10-I through 10-III are schematic diagrams illustrating an Nth order decomposed images of high frequency according to some embodiments of the present disclosure;

FIG. 11 is a flowchart illustrating an exemplary process for determining a final image of the original image according to some embodiments of the present disclosure;

FIGS. 14-I through 14-V is are schematic diagrams illustrating patching at least one edge of an image according to some embodiments of the present disclosure;

FIGS. 15-I through 15-V are schematic diagrams illustrating patching at least one edge of an image according to some embodiments of the present disclosure;

FIG. 16 is a flowchart illustrating an exemplary process for determining a mapping curve of a target region according to some embodiments of the present disclosure;

FIG. 19 is a flowchart illustrating an exemplary process for determining a mapping curve of a target region according to some embodiments of the present disclosure;

FIG. 23 is a flowchart illustrating an exemplary process for processing an image according to some embodiments of the present disclosure.

DETAILED DESCRIPTION

Figure 1:
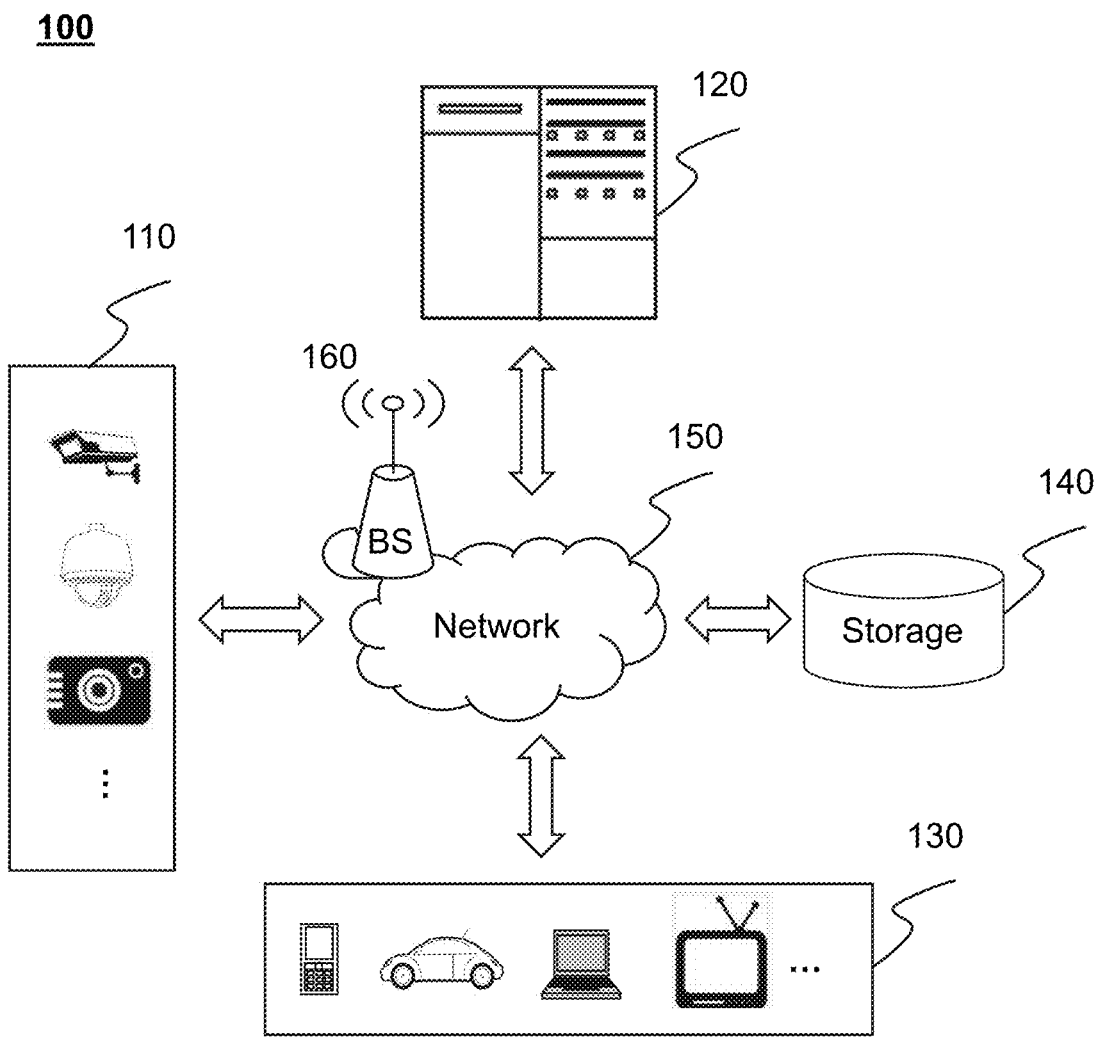
FIG. 1 is a block diagram illustrating an exemplary system for image processing according to some embodiments of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

Figure 2A:
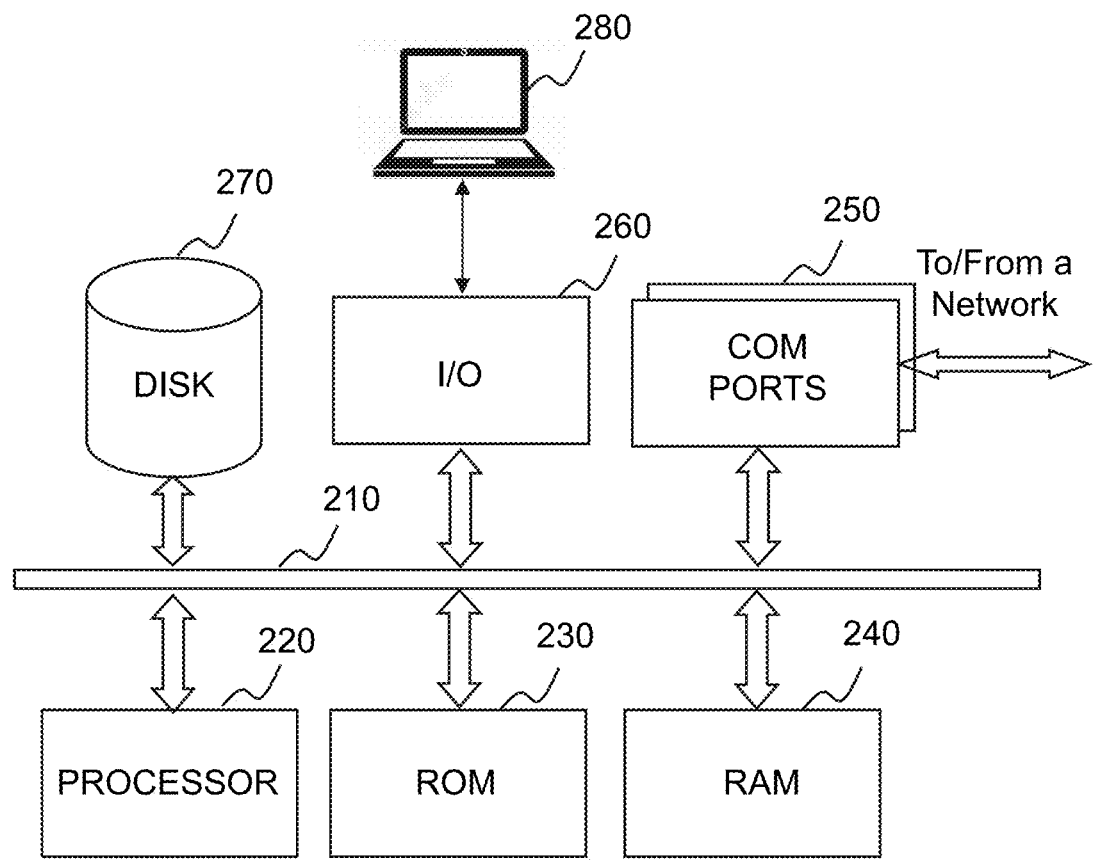
FIG. 2A is a schematic diagram illustrating an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 as illustrated in FIG. 2A) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, engine, module or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

An aspect of the present disclosure relates to systems and methods for image processing. According to the present disclosure, a luminance image of an original image may be first decomposed and then reconstructed after adjusting the frequencies of pixels. The luminance of pixels in a processed image may be determined based on the luminance of corresponding pixels in the decomposed images and the reconstructed images. According to the present disclosure, a target region of an image may be processed according to determining the value of pixels in the target region based on statistical probabilities associated with gray levels in the target region and a plurality of predetermined coefficients. According to the systems and methods in the present disclosure, an image may display more details and increase original contrast.

FIG. 1 is a block diagram illustrating an exemplary image processing system 100 according to some embodiments of the present disclosure. The image processing system 100 may include an imaging device 110, an image processing device 120, a terminal 130, a storage 140, a network 150, and a base station 160.

The imaging device 110 may be configured to capture one or more images. The one or more images may be images about a static or moving object. The image may include a still picture, a motion picture, a video (offline or live streaming), a frame of a video, or a combination thereof.

The imaging device 110 may be any suitable device that is capable of capturing an image. The imaging device 110 may be and/or include a camera, a sensor, a video recorder, or the like, or any combination thereof. The imaging device 110 may be and/or include any suitable type of camera, such as a fixed camera, a fixed dome camera, a covert camera, a Pan-Tilt-Zoom (PTZ) camera, a thermal camera, etc. The imaging device 110 may be and/or include any suitable type of sensor, such as an audio sensor, a light sensor, a wind speed sensor, or the like, or a combination thereof.

The light sensor (e.g., an infrared detector) may be configured to obtain a light signal, such as a near infrared signal. The audio sensor may be configured to obtain an audio signal. The audio signal and the light signal may be configured to provide reference information for processing images captured by the imaging device 110.

Data obtained by the imaging device 110 (e.g., images, audio signals, light signals, etc.) may be stored in the storage 140, sent to the image processing device 120 or the terminal(s) 130 via the network 150.

The image processing device 120 may be configured to process an image. For example, the image processing device 120 may be configured to, based on the image, identify luminance of the image, decompose a first luminance image of the image, reconstruct a second luminance image of the image, determine a final image associated with the image, or the like, or a combination thereof. As another example, the image processing device 120 may be configured to identify a target region of the image, determine a statistical probability associated with the gray level of the target region, determine a mapping curve of the target region, determine a value of a pixel in the image, or the like, or any combination thereof. The image that the imaging processing device 120 processes may be captured by the imaging device 110 or retrieved from another source (e.g., the storage 140, the terminal(s) 130, etc.).

The image processing device 120 may further be configured to generate a control signal. The control signal may be generated based on a feature of an object being imaged, luminance of a scene when an image of the scene is being acquired, displayed luminance of an image, or the like, or any combination thereof. The control signal may be used to control the imaging device 110. For example, the image processing device 120 may generate a control signal to instruct the imaging device 110 (e.g., a camera) to track an object and obtain an image of the object.

The image processing device 120 may be any suitable device that is capable of processing an image. For example, the image processing device 120 may include a high-performance computer specializing in image processing or transaction processing, a personal computer, a portable device, a server, a microprocessor, an integrated chip, a digital signal processor (DSP), a tablet computer, a personal digital assistant (PDA), a mobile phone, or the like, or a combination thereof. In some embodiments, the image processing device 120 may be implemented on a computing device 200A shown in FIG. 2A and/or a mobile device 200B shown in FIG. 2B.

In some embodiments, the image processing device 120 may include one or more processing engines (e.g., single-core processing engine(s) or multi-core processor(s)). Merely by way of example, the image processing device 120 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The terminal 130 may be connected to or communicate with the image processing device 120. The terminal 130 may allow one or more operators (e.g., a law enforcement officer, etc.) to control the production and/or display of the data (e.g., the image captured by the imaging device 110) on a display. The terminal 130 may include an input device, an output device, a control panel, a display (not shown in FIG. 1), or the like, or a combination thereof.

Exemplary input device may include a keyboard, a touch screen, a mouse, a remote controller, a wearable device, or the like, or a combination thereof. For example, the input device may include alphanumeric and other keys that may be inputted via a keyboard, a touch screen (e.g., with haptics or tactile feedback, etc.), a speech input, an eye tracking input, a brain monitoring system, or any other comparable input mechanism. The input information received through the input device may be communicated to the image processing device 120 via the network 150 for further processing. Exemplary input device may further include a cursor control device, such as a mouse, a trackball, or cursor direction keys to communicate direction information and command selections to, for example, the image processing device 120 and to control cursor movement on display or another display device.

A display may be configured to display the data received (e.g., the image captured by the imaging device 110). The information may include data before and/or after data processing, a request for input or parameter relating to image acquisition and/or processing, or the like, or any combination thereof. Exemplary display may include a liquid crystal display (LCD), a light emitting diode (LED)-based display, a flat panel display or curved screen (or television), a cathode ray tube (CRT), or the like, or a combination thereof.

The storage 140 may store data and/or instructions. The data may include an image (e.g., an image obtained by the imaging device 110) relevant information of the image, etc. In some embodiments, the storage 140 may store data and/or instructions that the server 110 may execute or use to perform exemplary methods described in the present disclosure. In some embodiments, the storage 140 may include a mass storage, a removable storage, a volatile read-and-write memory, a read-only memory (ROM), or the like, or any combination thereof. Exemplary mass storage may include a magnetic disk, an optical disk, a solid-state drive, etc.

Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The network 150 may facilitate communications between various components of the image processing system 100. The network 150 may be a single network, or a combination of various networks. Merely by way of example, the network 150 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, an infrared ray, or the like, or any combination thereof. The network 150 may also include various network access points, e.g., wired or wireless access points such as one or more base stations 160 or Internet exchange points through which a data source may connect to the network 150 in order to transmit information via the network 150.

It should be noted that the descriptions above in relation to the image processing system 100 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, part or all of the image data generated by the imaging device 110, may be processed by the terminal 130. As another example, the imaging device 110 and the image processing device 120 may be implemented in one single device configured to perform the functions of the imaging device 110 and the image processing device 120 described in this disclosure. As still another example, the terminal 130, and the storage 140 may be combined with or part of the image processing device 120 as a single device. Similar modifications should fall within the scope of the present disclosure.

FIG. 2A is an architecture illustrating an exemplary computing device 200A on which a specialized system incorporating the present teaching may be implemented. Such a specialized system incorporating the present teaching has a functional block diagram illustration of a hardware platform that may include user interface elements. A computing device 200A may be a general-purpose computer or a special purpose computer. The computing device 200A may be used to implement any component of image processing as described herein. For example, the image processing device 120 may be implemented on a computer such as the computing device 200, via its hardware, software program, firmware, or a combination thereof. Although only one such computer is shown, for convenience, the computer functions relating to image processing as described herein may be implemented in a distributed fashion on a number of similar platforms, to distribute the processing load.

The computing device 200A, for example, may include a communication (COM) ports 250 connected to and from a network connected thereto to facilitate data communications. The computing device 200A may also include a processor 220, in the form of one or more processors, for executing program instructions stored in a storage device (e.g., a disk 270, a read only memory (ROM) 230, or a random-access memory (RAM) 240)), and when executing the program instructions, the processor 220 may be configured to cause the computing device 200A to perform the functions thereof described herein.

The exemplary computer platform may include an internal communication bus 210, program storage, and data storage of different forms, e.g., a disk 270, a ROM 230, or a RAM 240, for various data files to be processed and/or communicated by the computer, as well as possibly program instructions to be executed by the processor 220. The computing device 200A may also include an I/O component 260, supporting input/output flows between the computer and other components therein such as user interface elements (not shown in FIG. 2A). The computing device 200A may also receive programming and data via network communications.

Aspects of the methods of the image processing and/or other processes, as described herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a scheduling system into the hardware platform(s) of a computing environment or other system implementing a computing environment or similar functionalities in connection with image processing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A non-transitory machine-readable medium may take many forms, including but not limited to, a tangible storage medium, a carrier wave medium or physical transmission medium. Non-volatile storage media include, for example, optical or magnetic disks, such as any of the storage devices in any computer(s), or the like, which may be used to implement the system or any of its components shown in the drawings. Volatile storage media may include dynamic memory, such as a main memory of such a computer platform. Tangible transmission media may include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media may include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described herein may be embodied in a hardware device, it may also be implemented as a software only solution, e.g., an installation on an existing server. In addition, image processing as disclosed herein may be implemented as a firmware, firmware/software combination, firmware/hardware combination, or a hardware/firmware/software combination.

Figure 2B:
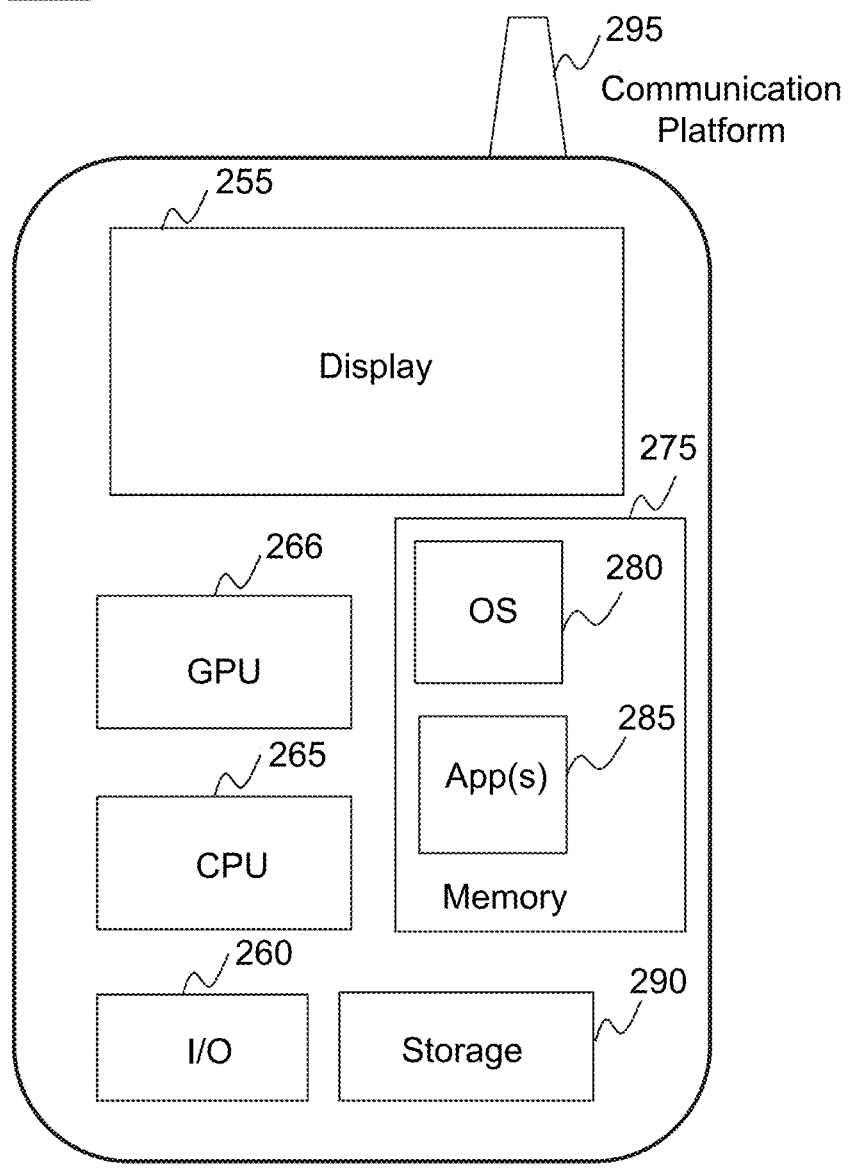
FIG. 2B is a schematic diagram illustrating an exemplary mobile device according to some embodiments of the present disclosure.

FIG. 2B is a schematic diagram illustrating an exemplary mobile device 200B according to some embodiments of the present disclosure. In some embodiments, the mobile device 200B may illustrate hardware and/or software components of the terminal 130. As illustrated in FIG. 2B, the mobile device 200B may include a communication platform 295, a display 255, a graphic processing unit (GPU) 266, a central processing unit (CPU) 265, an I/O 260, a memory 275, and a storage 290. In some embodiments, any other suitable component, including but not limited to a system bus or a controller (not shown), may also be included in the mobile device 200B. In some embodiments, a mobile operating system 280 (e.g., iOS™, Android™, Windows Phone™, etc.) and one or more applications 285 may be loaded into the memory 275 from the storage 290 in order to be executed by the CPU 265. The applications 285 may include a browser or any other suitable mobile apps for receiving and rendering information relating to image processing or other information from, for example, the image processing device 120. User interactions with the information stream may be achieved via the I/O 260 and provided to the image processing device 120 and/or other components of the Diagnostic and treatment system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 3:
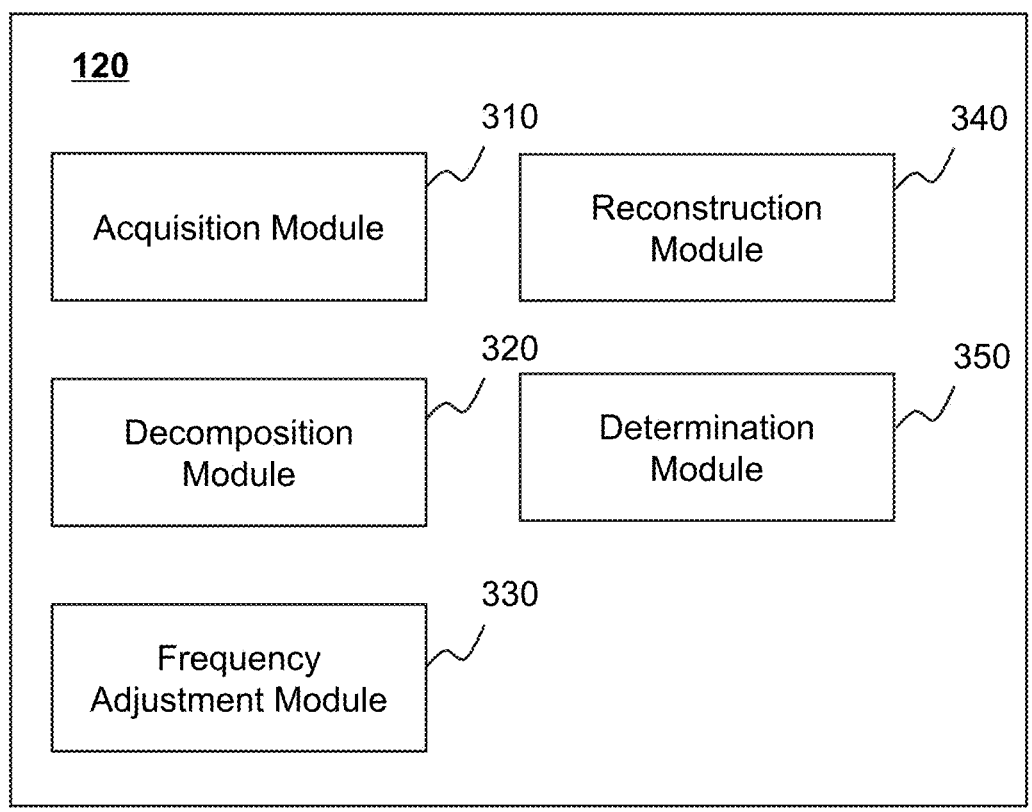
FIG. 3 is a block diagram illustrating an exemplary image processing device according to some embodiments of the present disclosure.

FIG. 3 is a block diagram illustrating an exemplary image processing device 120 according to some embodiments of the present disclosure of the present disclosure. The image processing device 120 may include an acquisition module 310, a decomposition module 320, a frequency adjustment module 330, a reconstruction module 340, and a determination module 350. The processor 220 may include more or fewer components without loss of generality. For example, two of the modules may be combined into a single module, or one of the modules may be divided into two or more modules. As another example, one or more of the modules may reside on different computing devices (e.g., a desktop, a laptop, a mobile device, a tablet computer, a wearable computing device, or the like, or a combination thereof). As still another example, the image processing device 120 may be implemented on the computing device 200A shown in FIG. 2A or the mobile device 200B shown in FIG. 2B.

Here and also throughout the present disclosure, a module may be implemented in many different ways and as hardware, software or in different combinations of hardware and software. For example, all or parts of a module implementations may be a processing circuitry that may include part or all of an instruction processor, such as a central processing unit (CPU), a microcontroller, a microprocessor; or an application specific integrated circuit (ASIC), a digital signal processor (DSP), a digital signal processing device (DSPD), a programmable logic device (PLD), a field programmable gate array (FPGA), a controller, other electronic components; or as circuitry that includes discrete logic or other circuit components, including an analog circuit component, a digital circuit component or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The acquisition module 310 may be configured to acquire data of an original image. The original image may include a picture in a video sequence including signals sampled in both the horizontal and vertical directions. Exemplary data of the original image may include red green blue (RGB) data, Bayer data, Luma and Chroma (YUV) data, raw image format (RAW) data, joint photographic experts group (JPEG) data, or the like, or any combination thereof. In some embodiments, the acquisition module 310 may be connected to an I/O module (not shown in FIG. 3) to acquire data.

In some embodiments, the acquisition module 310 may also acquire data relating to the original image. The data relating to the original image may include a plurality of gray levels in the original image, a plurality of statistical probabilities associated with each gray level, etc.

The decomposition module 320 may be configured to decompose a luminance image of the original image. Exemplary techniques for decomposing an image may include a wavelet transform technique, a Gauss-pyramid technique, a Laplacian-pyramid technique, a contrast-pyramid technique, a wavelet-pyramid technique, or the like, or any combination thereof.

In some embodiments, the decomposition module 320 may decompose a luminance image by a wavelet transform decomposition to generate at least one decomposed image of high frequency and a decomposed image of low frequency. As used herein, "high frequency" is a relative term compared to "low frequency" relating to the frequency variation of brightness in the image. For example, the image of high frequency may display details, and the image of low frequency may display outlines. Exemplary wavelet transform decomposition algorithms may include stationary wavelet transform (SWT), orthogonal wavelet transform (OWT), fast wavelet transform (FWT), discrete wavelet transform (DWT), or the like, or any combination thereof. Merely by way of example, the decomposition module 320 may decompose an image into a decomposed image of low frequency and three decomposed images of high frequency in a horizontal direction, in a vertical direction, and in a diagonal direction by the SWT algorithm. The decomposed image of low frequency may include components showing outlines of an object in the decomposed image. Three decomposed images of high frequency may include components showing details of the object in the decomposed image in different directions, respectively.

In some embodiments, the decomposition module 320 may decompose the first luminance image by multiple orders of decompositions. In an N-th order decomposition, an N-th order decomposed image of low frequency and one or more N-th order decomposed images of high frequency may be obtained. In the subsequent decomposition of (N+1)-th order, the N-th order decomposed image of low frequency may be further decomposed to generate a (N+1)-th order decomposed image of low frequency and one or more (N+1)-order decomposed image of high frequency.

For example, the decomposition module 320 may perform a three-order wavelet transform decomposition (e.g., SWT) to generate a first-order decomposition set, a second-order decomposition set, and a third-order decomposition set. The decomposed image of low frequency from the first-order decomposition may be decomposed further to generate a second-order decomposed image of low frequency and one or more second-order decomposed images of high frequency. The second-order decomposed image of low frequency may be decomposed further to generate a third-order decomposed image of low frequency and one or more third-order decomposed images of high frequency. The first-order decomposition set and the second-order decomposition set may each include three decomposed images of high frequency, respectively. The third-order decomposition set may include a decomposed image of low frequency and three decomposed images of high frequency.

The frequency adjustment module 330 may be configured to adjust frequencies of pixels in a first image to generate a second image (or referred to as a frequency-adjusted image). The first decomposed image may be received from the decomposition module 320. In some embodiments, the frequency adjustment module 330 may adjust frequencies of pixels in the first image based on the frequency adjustment threshold corresponding to the first image. For example, the frequency adjustment module 330 may reduce the frequency of a pixel that is greater than a frequency adjustment threshold in the first image. As another example, the frequency adjustment module 330 may increase the frequency of a pixel that is less than the frequency adjustment threshold in the first image. In some embodiments, the frequency adjustment threshold corresponding to the first image may be provided by a user via, for example, the I/O 250. In some embodiments, the frequency adjustment threshold corresponding to the first decomposed image may be determined by the system 100 based on a default setting of the system 100, an empirical setting from prior imaging processing by the system 100 or a different system, a combination of a default setting or an empirical setting and a user input, etc. An empirical setting from prior imaging processing may be derived by, for example, machine learning.

An image subject to frequency adjustment may be a decomposed image obtained by, for example, decomposition as described elsewhere in the present disclosure. For instance, the frequency adjustment module 330 may adjust frequencies of pixels in a first decomposed image to generate a second decomposed image (or referred to as a frequency-adjusted decomposed image.

In some embodiments, the frequency adjustment module 330 may adjust frequencies of pixels in an image based on one or more adjustment factors corresponding to the image. For example, the frequency adjustment module 330 may adjust a frequency of a pixel in a first decomposed image of high frequency based on an adjustment factor corresponding to the first decomposed image of high frequency. In some embodiments, the adjustment factors corresponding to decomposed images of different orders may be the same or different.

The reconstruction module 340 may be configured to reconstruct a frequency-adjusted luminance image based on a plurality of frequency-adjusted decomposed images. The frequency-adjusted decomposed images may be generated from the frequency adjustment module 330. The frequency of a pixel in a frequency-adjusted decomposed image may be determined based on the frequency of a pixel locate at the same position in the corresponding decompose image before the frequency adjustment.

In some embodiments, the reconstruction may be a reverse process of the decomposition. The reconstruction may include multiple orders of reconstructions. In some embodiments, the number of orders in the reconstruction may be the same as the number of orders in the decomposition. For example, the reconstruction module 340 may reconstruct a frequency-adjusted luminance image by a three-order wavelet transform when the frequency-adjusted decomposed images are generated based on a three-order wavelet transform decomposition.

The determination module 350 may be configured to determine a final image of the original image based on the luminance image without the frequency adjustment, the frequency-adjusted luminance image, and the original image. The determination module 350 may determine a final image of the original image by first determining the position of a pixel in the original image, and then adjusting the frequency of the pixel based on the luminance of the pixel being at the same position in the corresponding luminance image before frequency adjustment; based on the frequency-adjusted pixels and their respective positions, the frequency-adjusted luminance image may be obtained.

In some embodiments, the determination module 350 may be configured to determine data relating to processing an image. For example, the determination module 350 may determine a mapping curve of a target region in the image, an optimal coefficient of the target region, an optimal curve of the target region, the value of a pixel in the target region, or the like, or any combination thereof. The term "optimal" (e.g., optimal coefficient, optimal curve) may be used to describe a factor only, and not for optimizing the value of a pixel in the target region.

It should be understood that the preceding description of the image processing device 120 is merely provided for the purposes of illustration, and not intended to limit the scope of the present disclosure. For persons having ordinary skills in the art, various variations and modifications may be made in the light of the present disclosure. For example, the image processing device 120 may also include a storage module (not shown in FIG. 3) for storing data relating to the image processing. However, those variations and modifications do not depart from the protecting scope of the present disclosure.

Figure 4:
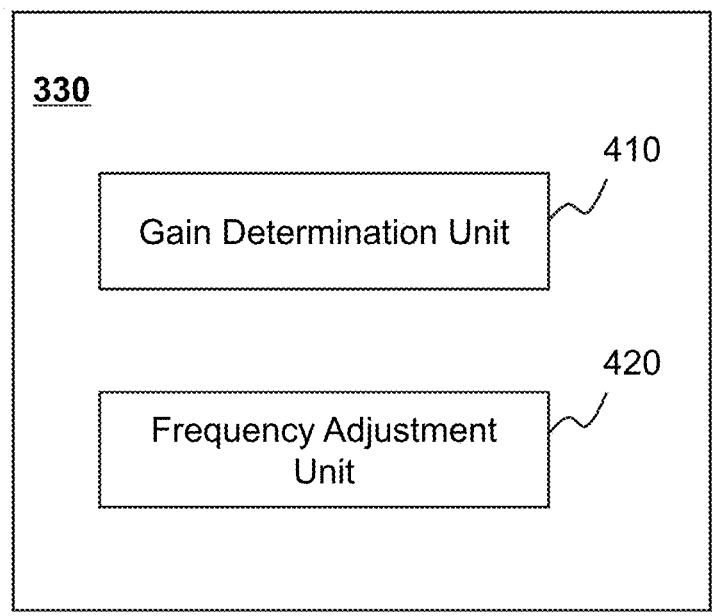
FIG. 4 is a block diagram illustrating an exemplary frequency adjustment module according to some embodiments of the present disclosure.

FIG. 4 is a block diagram illustrating an exemplary frequency adjustment module 330 according to some embodiments of the present disclosure.

The frequency adjustment module 330 may include a gain determination unit 410 and a frequency adjustment unit 420. The frequency adjustment module 330 may include more or fewer components without loss of generality. For example, two of the units may be combined into a single unit, or one of the units may be divided into two or more units. For example, one or more of the units may reside on different computing devices (e.g., a desktop, a laptop, a mobile device, a tablet computer, a wearable computing device, or the like, or a combination thereof). However, those variations and modifications do not depart from the protecting scope of the present disclosure.

The gain determination unit 410 may be configured to determine a gain of a pixel in an image that is to be adjusted (or referred to as an unadjusted image). The gain determination unit 410 may determine the gain of the pixel based on the frequency of the pixel in the first image and a frequency threshold associated with the first image.

The frequency adjustment unit 420 may be configured to adjust frequencies of pixels in an unadjusted image. The frequency adjustment unit 420 may adjust the frequency of a pixel in the unadjusted image based on a gain corresponding to the pixel in the unadjusted image. In some embodiments, the frequency of the corresponding pixel in the frequency-adjusted image may be determined based on the original frequency of the pixel and the gain of the original pixel in the unadjusted image.

Figure 5:
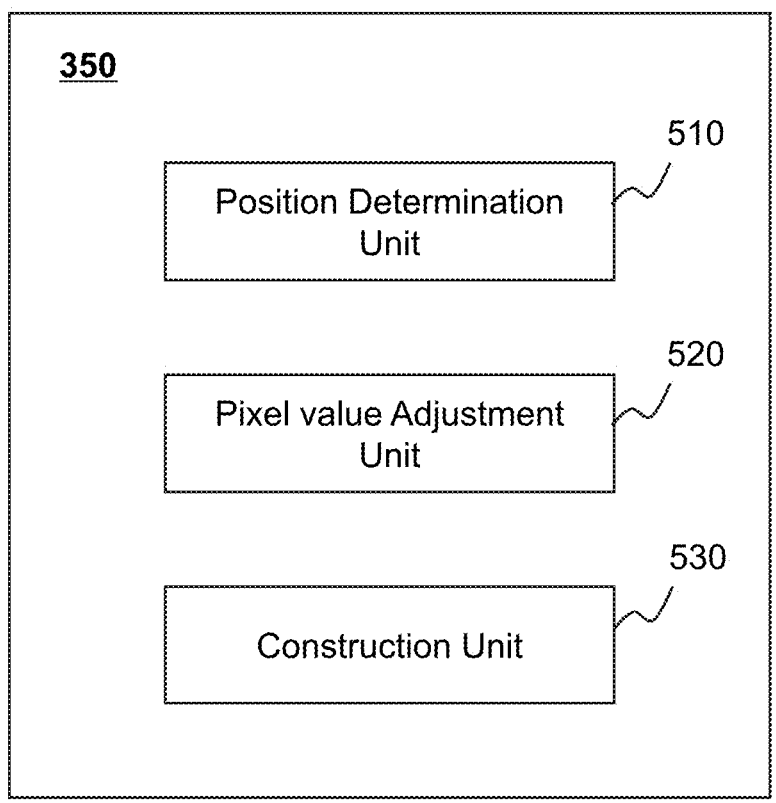
FIG. 5 is a block diagram illustrating an exemplary determination module according to some embodiments of the present disclosure.

FIG. 5 is a block diagram illustrating an example of a determination module 350 according to some embodiments of the present disclosure. The determination module 350 may include a position determination unit 510, a pixel value adjustment unit 520, and a construction unit 530. The determination module 350 may include more or fewer components without loss of generality. For example, two of the units may be combined into a single unit, or one of the units may be divided into two or more units. In one implementation, one or more of the units may reside on different computing devices (e.g., a desktop, a laptop, a mobile device, a tablet computer, a wearable computing device, or the like, or a combination thereof). However, those variations and modifications do not depart from the protecting scope of the present disclosure.

The position determination unit 510 may be configured to determine the position of a pixel in an image. For example, the position determination unit 510 may determine an original pixel in an original image, the position of a pixel in a luminance image before frequency adjustment, the position of a pixel in a frequency-adjusted luminance image, etc. The position of the pixel in the image may be represented by coordinates (e.g., orthogonal coordinates, spherical coordinates, polar coordinates, etc.) in, for example, a two-dimensional coordinate system, a three-dimensional coordinate system, etc. Merely by way of example, the position of an original pixel may be represented as (x, y) as illustrated in FIG. 10.

As used herein, an original image may refer to an image acquired by an imaging device (e.g., the imaging device 110 illustrated in FIG. 1). An original image may be stored or retrieved from a storage device (e.g., the storage 140 illustrated in FIG. 1, the disk 270 illustrated in FIG. 2A, or an external source, such as a hard disk, a wireless terminal, or the like, or any combination thereof, that is connected to or otherwise communicates with the system 100), or from an imaging device by which the original image is acquired. As used herein, an unadjusted image may refer to an image that is obtained by performing, on an original image, one or more operations (e.g., decomposition, transform, etc.) except for frequency adjustment. As used herein, a frequency-adjusted image may refer to an image that is obtained by performing, on an original image or an unadjusted image, frequency adjustment.

The pixel value adjustment unit 520 may be configured adjust a pixel value of an original pixel in an original image. For example, the pixel value adjustment unit 520 may adjust the pixel value of the original pixel in the original image to determine a pixel value of the final pixel (e.g., the pixel in the final image that is the same as the original pixel except for the pixel value adjustment) in a final image of the original image.

The construction unit 530 may be configured to construct a final image based on a plurality of final pixels.

Figure 6:
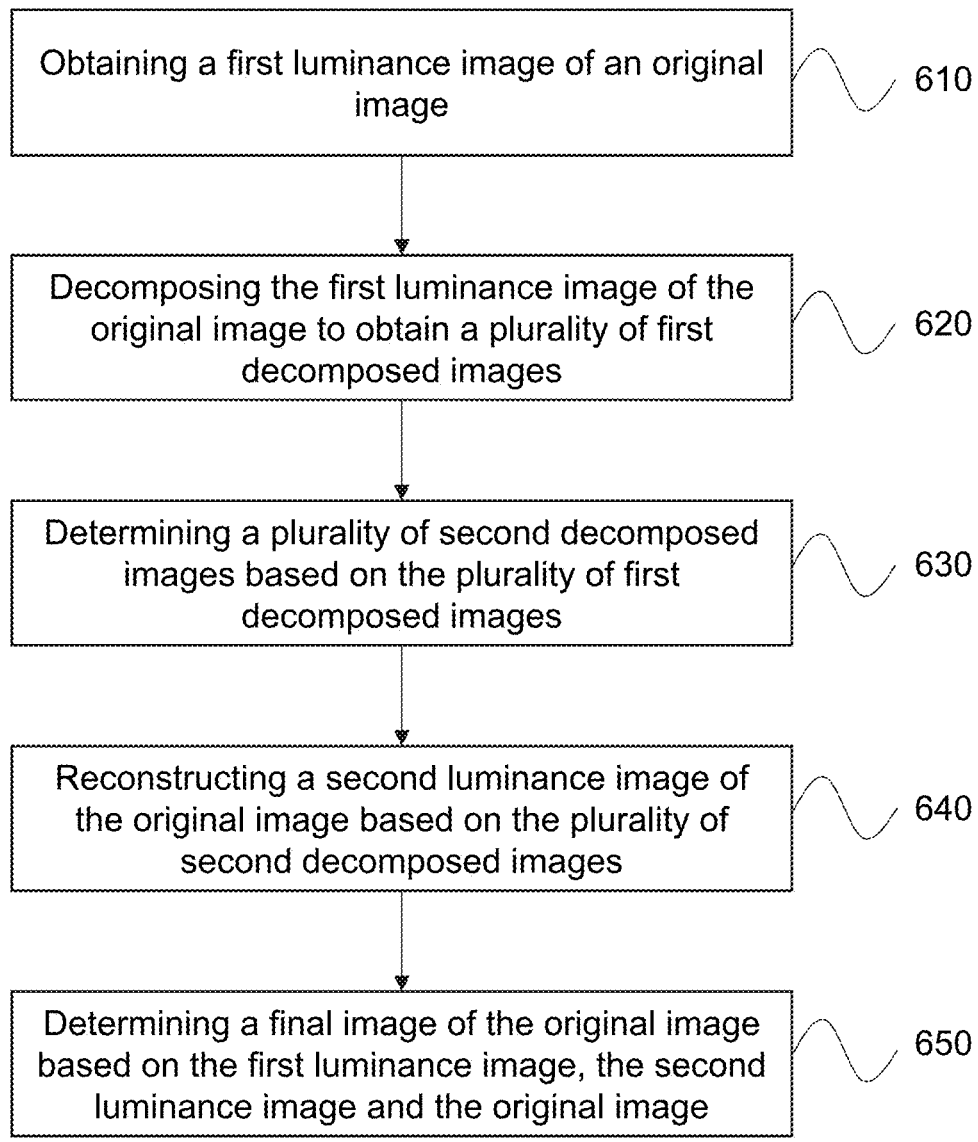
FIG. 6 a flowchart illustrating an exemplary process for processing an original image according to some embodiments of the present disclosure.

FIG. 6 is a flowchart illustrating an exemplary process 600 for processing an original image according to some embodiments of the present disclosure. In some embodiments, one or more operations of process 600 may be implemented in the image processing system 100 illustrated in FIG. 1. For example, the process 600 may be stored in the storage 140 in the form of instructions, and invoked and/or executed by the image processing device 120 (e.g., the processor 220 of the image processing device 120).

At 610, a first luminance image (or referred to as an unadjusted luminance image) of an original image may be obtained. The first luminance image of the original image may be obtained by determining luminance of each pixel in the original image. In some embodiments, the original image may be captured by one or more sensors and/or imaging devices. In some embodiments, the original image may be retrieved from a storage device (e.g., the storage 140 illustrated in FIG. 1, the disk 270 illustrated in FIG. 2A) or received from an imaging device (e.g., the imaging device 110 illustrated in FIG. 1). In some embodiments, the original image may be retrieved from an external source, such as a hard disk, a wireless terminal, or the like, or any combination thereof, that is connected to or otherwise communicates with the system 100. In some embodiments, the original image may include red green blue (RGB) data, Bayer data, Luma and Chroma (YUV) data, raw image format (RAW) data, joint photographic experts group (JPEG) data, or the like, or any combination thereof.

At 620, the first luminance image of the original image may be decomposed to obtain a plurality of first decomposed images (or referred to as unadjusted decomposed images). The first decomposed images may include frequency information of the original image. For example, the first decomposed images may include information relating to the frequencies of one or more pixels in the original image. The first decomposed image of high frequency may include information relating to details of an object in the first decomposed image. The first decomposed image of low frequency may include information relating to outlines of the object in the first decomposed image. In some embodiments, the decomposition of the first luminance image of the original image may be performed by the decomposition module 320 as illustrated in FIG. 3.

In some embodiments, the decomposition of the first luminance image of the original image may be performed based on different decomposition techniques. Exemplary decomposition techniques may include pyramid decomposition, wavelet decomposition, Laplace transform, filtering, or the like, or any combination thereof. Exemplary pyramid decomposition techniques may include a Gauss-pyramid, a Laplacian-pyramid, a contrast-pyramid, a wavelet-pyramid, or the like, or any combination thereof. Exemplary wave decomposition techniques may include a stationary wavelet transform (SWT), a fast wavelet transform (FWT), a discrete wavelet transform (DWT), an orthogonal wavelet transform (OWT), or the like, or any combination thereof. Exemplary filtering techniques may include low-pass filtering, feather-edge filtering, etc.

For illustration purposes, the wavelet decomposition may be described as an example. The wavelet decomposition of the first luminance image may generate at least one decomposed image of high frequency and a decomposed image of low frequency. One or more orders of decomposition may be performed based on the wavelet decomposition. For example, a three-order wavelet decomposition (e.g., SWT) of the first luminance image of the original image may generate a first-order decomposition set, a second-order decomposition set, and a third-order decomposition set. The first-order wavelet decomposition set may include three first (or unadjusted) decomposed images of high frequency. The second-order wavelet decomposition set may include three first (or unadjusted) decomposed images of high frequency. The third-order wavelet decomposition set may include a first (or unadjusted) decomposed image of low frequency and three first (or unadjusted) decomposed images of high frequency. The first (or unadjusted) decomposed images of high frequency in the same order may include frequency information in a horizontal direction, in a vertical direction, and in a diagonal direction, respectively. The direction may be determined based on a two-dimensional coordinate system. The two-dimensional coordinate system may include an x axis and a y axis. For example, the horizontal direction may be parallel to the x axis. The vertical direction may be parallel to the y axis.

At 630, a plurality of second (or frequency-adjusted) decomposed images may be determined based on the plurality of first (or unadjusted) decomposed images. In some embodiments, one or more frequency adjustment operations for determining the second (or frequency-adjusted) decomposed images may be performed by the frequency adjustment module 330 as illustrated in FIGS. 3 and 4.

The second (or frequency-adjusted) decomposed image may be determined according to adjusting the frequencies of the pixels in the first decomposed image. In some embodiments, the frequencies of the corresponding pixels in the second (or frequency-adjusted) decomposed image may be determined based on the frequencies of the pixels in the first (or unadjusted) decomposed image and a frequency adjustment threshold associated with the first (or unadjusted) decomposed image. For example, the frequency of a pixel that is greater than a frequency adjustment threshold in the first decomposed image may be reduced to provide the frequency of the corresponding pixel in the second decomposed image. A frequency of a pixel that is lower than the frequency adjustment threshold in the first decomposed image may be increased to provide the frequency of the corresponding pixel in the second decomposed image. The frequency adjustment threshold may be varied according to different application scenarios of the image processing system 100. For example, the frequency adjustment threshold corresponding to the first decomposed image may be provided by a user via, for example, the I/O 250. As another example, the frequency adjustment threshold corresponding to the first decomposed image may be determined by the system 100 based on a default setting of the system 100, an empirical setting from prior imaging processing by the system 100 or a different system, a combination of a default setting or an empirical setting and a user input, etc. An empirical setting from prior imaging processing may be derived by, for example, machine learning.

In some embodiments, the frequencies of the corresponding pixels in the second (or frequency-adjusted) decomposed image may be determined based on the frequencies of the pixels in the first decomposed image and gains of the pixels in the first (or unadjusted) decomposed image. The gain of the pixel may be determined based on the frequency of the pixel and a frequency adjustment threshold associated with the first decomposed image. Exemplary processes for determining a second decomposed image may be found elsewhere in the present disclosure. See, for example, FIG. 7 and the description thereof.

At 640, a second (or frequency-adjusted) luminance image of the original image may be reconstructed based on the plurality of second (or frequency-adjusted) decomposed images. In some embodiments, one or more operations of reconstructing the second luminance image may be performed by the reconstruction module 340 as illustrated in FIG. 3.

The reconstruction of the second luminance image may include or be a reverse process of the decomposition. Exemplary reconstruction techniques may include pyramid reconstruction, wavelet reconstruction, Laplace transform reconstruction, inverse filtering, or the like, or any combination thereof. Multiple orders of reconstruction may be performed. In some embodiments, the number of orders in the reconstruction may be the same as the number of orders in the decomposition. For example, the reconstruction module 340 may reconstruct a second (or frequency-adjusted) luminance image by a three-order wavelet transform when the decomposed images are generated based on a three-order wavelet transform decomposition.

At 650, a final image of the original image may be determined based on the first (or unadjusted) luminance image, the second (or frequency-adjusted) luminance image, and the original image. In some embodiments, one or more operations of determining the final image of the original image may be performed by the determination module 350 as illustrated in FIG. 3.

The final image may include a plurality of final pixels corresponding to original pixels in the original image. The values of the final pixels may be determined based on the first (or unadjusted) luminance image, the second (or frequency-adjusted) luminance image, and the original image. For example, the values of the final pixels may be determined by multiplying the values of corresponding original pixels in the original image by a ratio of the second luminance image to the first luminance image. In some embodiments, exemplary processes for determining the final image of the original image may be elsewhere in the present disclosure. See, for example, FIG. 11 and the description thereof.

It should be noted that the above description of process 600 is merely provided for the purposes of illustration, and not intended to be understood as the only embodiment. For persons having ordinary skills in the art, various variations and modifications may be conduct under the teaching of some embodiments of the present disclosure. In some embodiments, some steps may be reduced or added. For example, 610 may be omitted. The luminance of an image may be predetermined and stored in a storage medium of the image processing system 100. However, those variations and modifications may not depart from the protecting of some embodiments of the present disclosure.

Figure 7:
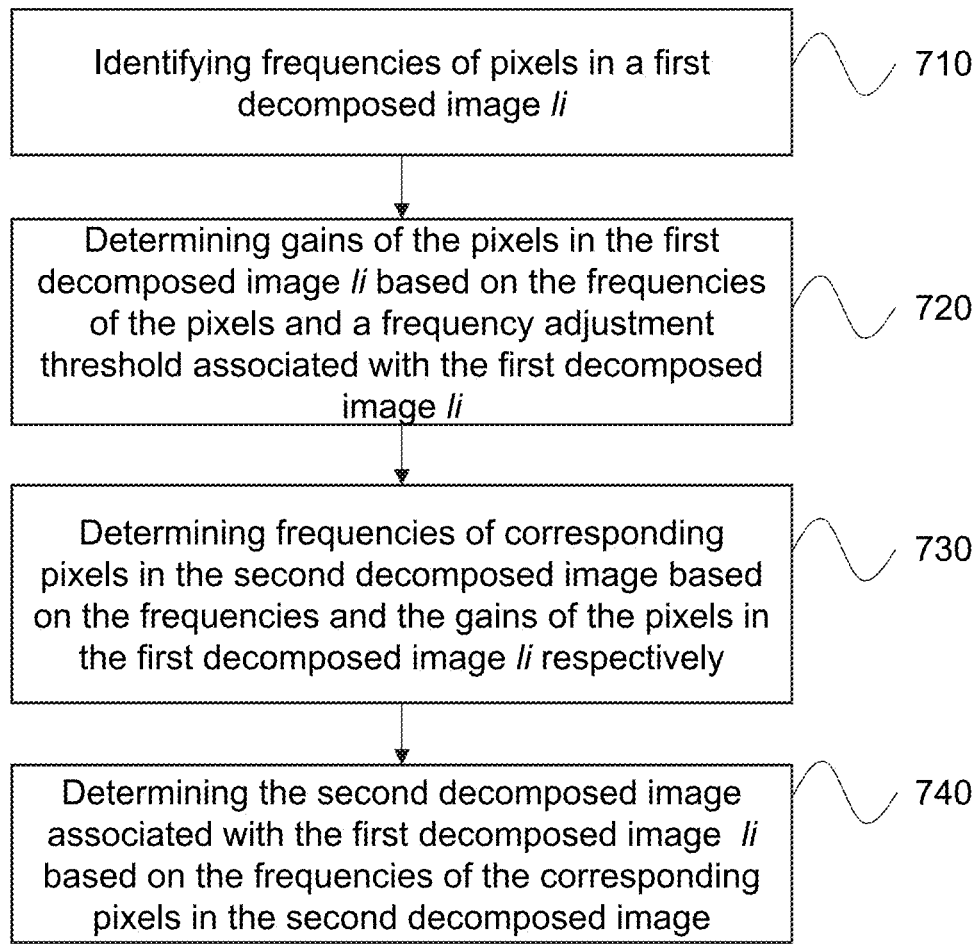
FIG. 7 is a flowchart illustrating an exemplary process for determining a decomposed image according to some embodiments of the present disclosure.

FIG. 7 is a flowchart illustrating an exemplary process 700 for determining a second (or frequency-adjusted) decomposed image according to some embodiments of the present disclosure. In some embodiments, one or more operations of process 700 for determining a second decomposed image may be implemented in the image processing system 100 illustrated in FIG. 1. For example, the process 700 may be stored in the storage 140 in the form of instructions, and invoked and/or executed by the image processing device 120 (e.g., the processor 220 of the image processing device 120, the frequency adjustment module 330 as illustrated in FIGS. 3-4).

At 710, frequencies of pixels in a first (or unadjusted) decomposed image Ii may be identified. For example, the frequencies of all or a portion of the pixels included in the first decomposed image Ii may be identified. In some embodiments, the frequencies of the pixels may be determined by Fourier transform, Z transform, Laplace transform, or the like, or any combination thereof. In some embodiments, the frequencies of the pixels may be predetermined and stored in a storage medium of the image processing device 120.

At 720, gains of the pixels in the first (or unadjusted) decomposed image Ii may be determined based on the frequencies of the pixels and a frequency adjustment threshold associated with the first decomposed image Ii. In some embodiments, the gains of different pixels in the same first decomposed image Ii may be the same or different. In some embodiments, the gain of a pixel may be determined based on the position of the pixel in the first decomposed images. Exemplary processes for determining a gain of a pixel in a first decomposed image may be found elsewhere in the present disclosure. See, for example, FIG. 8 and the description thereof.

The frequency adjustment threshold may vary in different application scenarios of the image processing system 100. For example, the frequency adjustment threshold associated with the first (or unadjusted) decomposed image may be provided by a user via, for example, the I/O 250. In some embodiments, the frequency adjustment threshold corresponding to the first decomposed image may be determined by the system 100 based on a default setting of the system 100, an empirical setting from prior imaging processing by the system 100 or a different system, a combination of a default setting or an empirical setting and a user input, etc. An empirical setting from prior imaging processing may be derived by, for example, machine learning.

At 730, frequencies of corresponding pixels in the second (or frequency-adjusted) decomposed image may be determined based on the original frequencies and the gains of the original pixels in the first (or unadjusted) decomposed image Ii.

In some embodiments, the frequency of a corresponding pixel in the second (or frequency-adjusted) decomposed image may be determined by multiplying the original frequency by the gain corresponding to the original pixel in the first (or unadjusted) decomposed image Ii. A pixel in the second decomposed image is considered to correspond to an original pixel in the first decomposed image Ii or in an original image if the two pixels correspond to a same physical point in the space or in an object to which the original image, or the first decomposed image, or the second decomposed image relates. A pixel in the second decomposed image and a corresponding original pixel in the first decomposed image Ii or in an original image may be considered to be located at a same position. In some embodiments, an original pixel in the first decomposed image Ii or in an original image and the corresponding pixel in the second decomposed image may be the same except for the frequency adjustment.

At 740, the second (or frequency-adjusted) decomposed image associated with the first (or unadjusted) decomposed image Ii may be determined based on the frequencies of the corresponding pixels in the second decomposed image. The second decomposed image may be associated with an original image that is associated with the first (or unadjusted) decomposed image.

A pixel in the second (or frequency-adjusted) decomposed image may be located at the same position as the corresponding original pixel in the original image. The second decomposed image may be generated by arranging the corresponding pixels in the same way as the original pixels in the original image.

In some embodiments, the plurality of second (or frequency-adjusted) decomposed images at operation 630 may be determined by implementing operations 710-740 on each of the plurality of the first (or unadjusted) decomposed images.

FIG. 8 is a flowchart illustrating an exemplary process 800 for determining a gain of a pixel in a first decomposed image according to some embodiments of the present disclosure. In some embodiments, one or more operations of process 800 for determining a gain of a pixel may be implemented in the image processing system 100 illustrated in FIG. 1. For example, the process 800 may be stored in the storage 140 in the form of instructions, and invoked and/or executed by the image processing device 120 (e.g., the processor 220 of the image processing device 120, the determination module 350 as illustrated in FIG. 3, the gain determination unit 410 as illustrated in FIG. 4).

At 810, a certain number of pixels that are located at a same position from a plurality of first (or unadjusted) decomposed images may be identified. The plurality of first decomposed images may be obtained by decomposing a first (or unadjusted) luminance image of an original image at 620 illustrated in FIG. 6. The plurality of first decomposed images may be stored in a storage medium of the image processing system 100. In some embodiments, the certain number of pixels may include pixels from all or a portion of the plurality of first decomposed images. For example, the certain number of pixels from three first decomposed images obtained by decomposition of a same order may be identified. In some embodiments, the particular number of pixels may be all or a portion of the pixels in the one or more first decomposed images. For example, all the pixels that are located at a same position from three first decomposed images obtained by the decomposition of a same order may be identified.

The same position may be determined based on a position of a pixel to be adjusted in the first decomposed image Ii. The pixel to be adjusted may be determined based on the frequency and the gain of the original pixel in the first decomposed image Ii. FIG. 10-I, FIG. 10-II, and FIG. 10-III illustrate examples of pixels that are located at a same position.

At 820, the frequencies of the identified pixels may be determined. In some embodiments, the frequency of an identified pixel may be determined by Fourier transform, Z transform, Laplace transform, or the like, or any combination thereof. In some embodiments, the frequencies of the identified pixels may be predetermined and stored in a storage medium of the image processing device 120.

At 830, the frequencies of the identified pixels may be filtered to obtain the particular number of filtered frequencies. In some embodiments, the filter frequency may be obtained using a Butterworth filter, a Chebyshev filter, a Bessel filter, an elliptic filter, a Gaussian filter, an Hourglass filter, a raised-cosine filter, or the like, or any combination thereof. The filtered frequencies may be associated with positions of the identified pixels.

Exemplary processes for obtaining a filtered frequency associated with a position may be found elsewhere in the present disclosure. See, for example, FIG. 9 and the description thereof.

At 840, the average filtered frequency associated with the position may be determined based on the filtered frequencies. The average filtered frequency may be an average value of the filtered frequencies of pixels at a same position in the one or more first (or unadjusted) decomposed images. The average value may include an arithmetic mean value, a geometric mean value, a square mean value, a harmonic mean value, a weighted average value, or the like, or any combination thereof. In some embodiments, the average filtered frequency of a pixel in a first decomposed image may be the same as frequencies of pixels at the same position in one or more first decomposed images of a same order.

At 850, a gain associated with the position may be determined based on the average filtered frequency. In some embodiments, the gains of pixels at a same position of the first decomposed images of high frequency of a same order may be the same or different.

It should be noted that above description of process 800 is merely provided for the purposes of illustration, and not intended to be understood as the only embodiment. For persons having ordinary skills in the art, various variations and modifications may be conduct under the teaching of some embodiments of the present disclosure. For example, the gain associated with the position may be determined based on filtered frequencies of the identified pixels. Operation 840 may be omitted. As another example, the gains of the pixels in the first decomposed image Ii at operation 720 nay be determined by implementing operations 810-850 on each of the pixels in the first decomposed image Ii. However, those variations and modifications may not depart from the protecting of some embodiments of the present disclosure.

For illustration purposes, a gain of a pixel (or associated with a position) in a first (or unadjusted) decomposed image may be determined based on an average filtered frequency of the pixels at a same position in the first (or unadjusted) decomposed images obtained by decomposition of a same order. The gain of a pixel in the first decomposed image may be determined based on equations (1) and (2):

$$G_{ij}(x, y) = m_i \left( \frac{A_{ag}(x, y) + \varepsilon}{\delta A'} \right)^{\gamma-1}, \quad (1)$$

$$A_{ag}(x, y) = \frac{1}{3N+1} \sum_{k=1}^{3N+1} A_k(x, y), \quad (2)$$

where i denotes the order of decomposition; j denotes any one of the first (or unadjusted) decomposed images obtained by the ith-order decomposition; Gij(x, y) denotes the gain of the pixel at the position (x, y) in the first (or unadjusted) decomposed image j obtained in the ith-order decomposition; Aag(x, y) denotes the average filtered frequency of the pixels at the position (x, y) in the first (or unadjusted) decomposed image j; mi denotes a gain adjustment factor corresponding to the ith-order decomposition, and 0≤m$_i$≤1; γ denotes a constant, and 0≤γ≤1; δ denotes a constant, and 0≤δ≤1; A' denotes an average frequency corresponding to the position (x, y) of the pixel in the first (or unadjusted) decomposed image j. For example, A' may be an arithmetic mean of the frequencies of pixels at a same position in one or more first (or unadjusted) decomposed images obtained by decomposition of the same order. ε denotes a noise level correlation parameter which may be used to suppress a noise amplification, and 0≤ε≤1. N denotes the total number of orders of decomposition. Ak(x, y) denotes a filtered frequency of the pixel at the position (x, y) in the first (or unadjusted) decomposed image k of the plurality of the first decomposed images obtained after the Nth-order decomposition. The number of the first (or unadjusted) decomposed images may be 3N+1. The gain adjustment factor mi of a first (or unadjusted) decomposed image of an order may vary in different application scenarios of the image processing system 100. In some embodiments, the mi of first (or unadjusted) decomposed images obtained by decomposition of different orders may be the same or different. For example, mi of first (or unadjusted) decomposed images obtained by decomposition of different orders may be the same or different. As another example, mi of first (or unadjusted) decomposed images obtained by decomposition of a same order may be the same or different.

Still for illustration purposes, a gain of a pixel (or associated with a position) in a first (or unadjusted) decomposed image may be determined based on filtered frequencies of pixels at a same position in the one or more first (unadjusted) decomposed images of a same order. The gain of a pixel (or associated with a position) in the first (or unadjusted) decomposed image may be determined based on equation (3):

$$G_{ij}(x, y) = m_i \left( \frac{A_{ij}(x, y) + \varepsilon}{\delta A'} \right)^{\gamma-1}, \quad (3)$$

where i denotes the order of decomposition; j denotes any one of the first decomposed images obtained by the ith-order decomposition; Gij(x, y) denotes the gain of the pixel at the position (x, y) in the first (or unadjusted) decomposed image j obtained in the ith-order decomposition; Aij(x, y) denotes the filtered frequency of the pixel at the position (x, y) in the first decomposed image j; mi denotes a gain adjustment factor corresponding to the ith-order decomposition, and 0≤m$_i$≤1; γ denotes a constant, and 0≤γ≤1; δ denotes a constant, and 0≤δ≤1; A' denotes an average frequency corresponding to the position (x, y) of the pixel in the first (or unadjusted) decomposed image j. For example, A' may be an arithmetic mean of frequencies of pixels at the same position in of the one or more first (or unadjusted) decomposed images of the same order. ε denotes a noise level correlation parameter which may be used to suppress a noise amplification, and 0≤ε≤1. The mi of each order's first decomposed image (or unadjusted) may be varied according to different application scenarios of the image processing system 100. In some embodiments, the mi of each order's first (or unadjusted) decomposed image may be same or different. For example, the mi of different order's first (or unadjusted) decomposed image may be different. As another example, the mi of same order's first (or unadjusted) decomposed image may be same.

Figure 9:
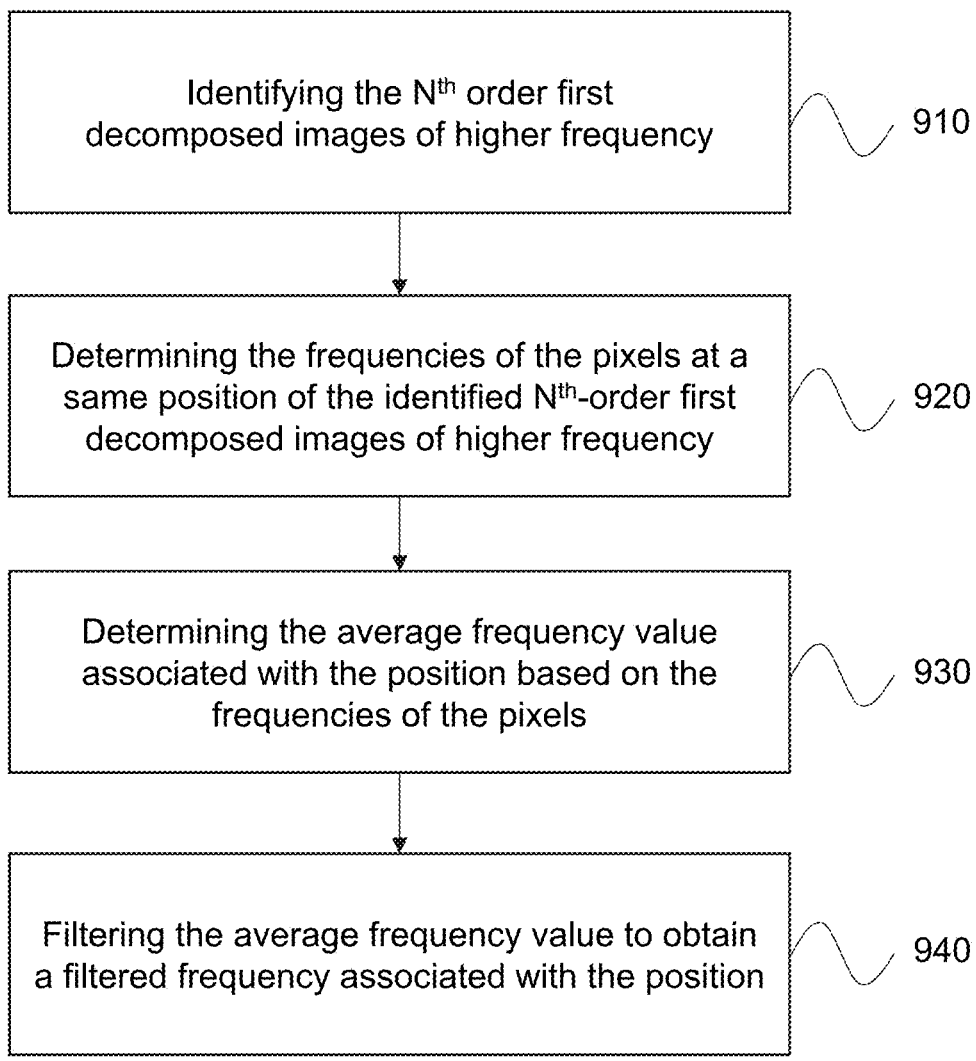
FIG. 9 is a flowchart illustrating an exemplary process for obtaining a filtered frequency associated with a position according to some embodiments of the present disclosure.

FIG. 9 is a flowchart illustrating an exemplary process 900 for obtaining a gain of a pixel in a first (or unadjusted) decomposed image according to some embodiments of the present disclosure. In some embodiments, one or more operations of process 900 for obtaining a gain of a pixel may be implemented in the image processing system 100 illustrated in FIG. 1. For example, the process 900 may be stored in the storage 140 in the form of instructions, and invoked and/or executed by the image processing device 120 (e.g., the processor 220 of the image processing device 120, the determination module 350 as illustrated in FIG. 3, the gain determination unit 410 as illustrated in FIG. 4).

At 910, the Nth-order decomposed images of high frequency may be identified. In response to the determination that the first decomposed image Ii is a first (or unadjusted) decomposed image with high frequency, one or more first (or unadjusted) decomposed images which are of the same order as the first decomposed image Ii are identified. For example, in response to the determination that the first decomposed image Ii is a second-order first decomposed image of high frequency, three second-order first decomposed images (the first decomposed image Ii and other two second-order first decomposed images) of high frequency may be identified.

At 920, the frequencies of the pixels at a same position of the identified Nth-order first (or unadjusted) decomposed images of high frequency may be determined. For example, the frequencies of the three pixels at a same position of the three identified Nth-order first decomposed images of high frequency may be determined.

In some embodiments, the number of pixels included in each first decomposed image may be the same, and the pixels may be arranged in the same way in each first decomposed image. FIG. 10-I through 10-III are schematic diagrams illustrating an $N^{th}$ order decomposed images of high frequency according to some embodiments of the present disclosure. FIG. 10-I shows a decomposed image of high frequency including four pixels a1, a2, a3, and a4. FIG. 10-II and FIG. 10-III are the other two decomposed images of high frequency obtained in the decomposition of the same order as the image in FIG. 10-I. FIG. 10-II and FIG. 10-III each may include four pixels, b1, b2, b3, and b4 in FIG. 10-II, and c1, c2, c3, and c4 in FIG. 10-III, respectively. For instance, the images in FIG. 10-I through FIG. 10-III may overlap with each other. There are three pixels at the position (x, y) in a two-dimensional coordinate system. The pixels a1, b1, and c1 are located at a same position. The pixels a2, b2, and c2 are located at a same position. The pixels a3, b3, and c3 are located at a same position. The pixels a4, b4, and c4 are located at a same position.

At 930, the average frequency value associated with the position may be determined based on the frequencies of the pixels. The average frequency value may be an average value of the absolute values of the frequencies of the pixels in the identified Nth-order decomposed images of high frequency. The average value may be an arithmetic mean value, a geometric mean value, a square mean value, a harmonic mean value, a weighted average value, or the like, or any combination thereof.

In some embodiments, the average frequency value associated with the position may be determined based on the absolute value of the frequency of the pixel in the first (or unadjusted) decomposed image Ii of high frequency and the absolute values of the frequencies of the pixels at the same position in the first (or unadjusted) decomposed images of high frequency of the same order as the first (or unadjusted) decomposed image Ii. For example, the average frequency value of pixel a1 may be based on the frequencies of pixels a1, b1, and c1.

Merely by way of example, an absolute value F1 of the frequency of a pixel at a position in the first (or unadjusted) decomposed image Ii of high frequency may be determined, and the other two absolute values, F2 and F3, of the two pixels (in the first (or unadjusted) decomposed images of high frequency by the decomposition of the same order as the image Ii) at the same position may be determined. The average frequency value F associated with the position may be determined based on equation (4):

$$F = \frac{F_1 + F_2 + F_3}{3}. \qquad (4)$$

At 940, the average frequency value F may be filtered to obtain a filtered frequency associated with the position. In some embodiments, the filtered frequency may be obtained using a Butterworth filter, a Chebyshev filter, a Bessel filter, an elliptic filter, a Gaussian filter, an Hourglass filter, a raised-cosine filter, or the like, or any combination thereof.

In some embodiments, a plurality of filtered frequencies may be obtained by implementing operations 910-940 on each of the pixels in the first (or unadjusted) decomposed image Ii.

In some embodiments, in response to the determination that the first decomposed image Ii is a first (or unadjusted) decomposed image with low frequency, the frequencies of one or more pixels in the first decomposed image Ii may be identified. Then the frequencies may be filtered to obtain filtered frequencies. The gains corresponding to the one or more pixels may be determined based on the corresponding filtered frequencies of the one or more pixels.

FIG. 11 is a flowchart illustrating an exemplary process 1100 for determining a final image of the original image according to some embodiments of the present disclosure. In some embodiments, one or more operations of process 1100 for determining a final image may be implemented in the image processing system 100 illustrated in FIG. 1. For example, the process 1100 may be stored in the storage 140 in the form of instructions, and invoked and/or executed by the image processing device 120 (e.g., the processor 220 of the image processing device 120, the determination module 350 as illustrated in FIG. 3 and FIG. 5).

At 1110, a position of an original pixel in the original image may be identified. For example, the original image may be in a two-dimensional coordinate system, and the position of an original pixel may be represented by (x, y). The value of coordinates x and y may be used to identify the position of the original pixel.

At 1120, a first (or unadjusted) luminance of a pixel in the first (or unadjusted) luminance image may be determined, in which the pixel in the first (or unadjusted) luminance image is at the same position as the original pixel in the original image. In some embodiments, the first (or unadjusted) luminance image may be determined as described in 610 in the present disclosure. In some embodiments, the first (or unadjusted) luminance image of the original image may be stored in a storage medium of the image processing system 100 or an external storage device.

In some embodiments, the same position may be identified based on the first luminance image and the original image. For example, pixels in the first (or unadjusted) luminance image and the original image may be arranged in the same way in identical two-dimensional coordinate systems. For the same position (x, y), there are two pixels, one in the first (or unadjusted) luminance image, and the other in the original image.

At 1130, a second (or frequency-adjusted) luminance of a pixel in the first luminance image may be determined, in which the pixel in the second (or frequency-adjusted) luminance image is at the same position as the original pixel in the original image. In some embodiments, the second (or frequency-adjusted) luminance image may be reconstructed from a plurality of the second (or frequency-adjusted) decomposed images as described in 640 in the present disclosure. In some embodiments, the second luminance image of the original image may be stored in a storage medium of the image processing system 100.

In some embodiments, the same position may be identified based on the second (or frequency-adjusted) luminance image and the original image. For example, pixels in the second (or frequency-adjusted) luminance image and the original image may be arranged in the same way in identical two-dimensional coordinate systems. For the same position (x, y), there are two pixels, one in the second (or frequency-adjusted) luminance image, and the other in the original image.

At 1140, a final pixel associated with the original pixel may be determined based on the first (or unadjusted) luminance and the second (or frequency-adjusted) luminance. The final pixel may be a pixel in a final image. The final pixel may include data of the final pixel such as luminance information of the final pixel, frequency information of the final pixel, hue information of the final pixel, saturation information of the final pixel, or the like, or any combination thereof.

In some embodiments, the data of the final pixel may be determined based on equation (5):

$$C_{out}(x, y) = \frac{I_{out}(x, y)}{I_{in}(x, y)} C_{in}(x, y), \qquad (5)$$

where $C_{in}(x, y)$ denotes the data of the original image associated with the original pixel at the position (x, y) in the original image, $C_{out}(x, y)$ denotes the data of the final pixel at the position (x, y) in the final image, $I_{in}(x, y)$ denotes the first (or unadjusted) luminance of the pixel at the position (x, y) in the first (or unadjusted) luminance image, and $I_{out}(x, y)$ denotes the second (or frequency-adjusted) luminance of the pixel at the position (x, y) in the second (or frequency-adjusted) luminance image.

Operations 1110 through 1140 may be performed for multiple positions and multiple original pixels at these positions to provide corresponding final pixels. At 1150, a final image of the original image may be determined based on the final pixels.

Figure 12:
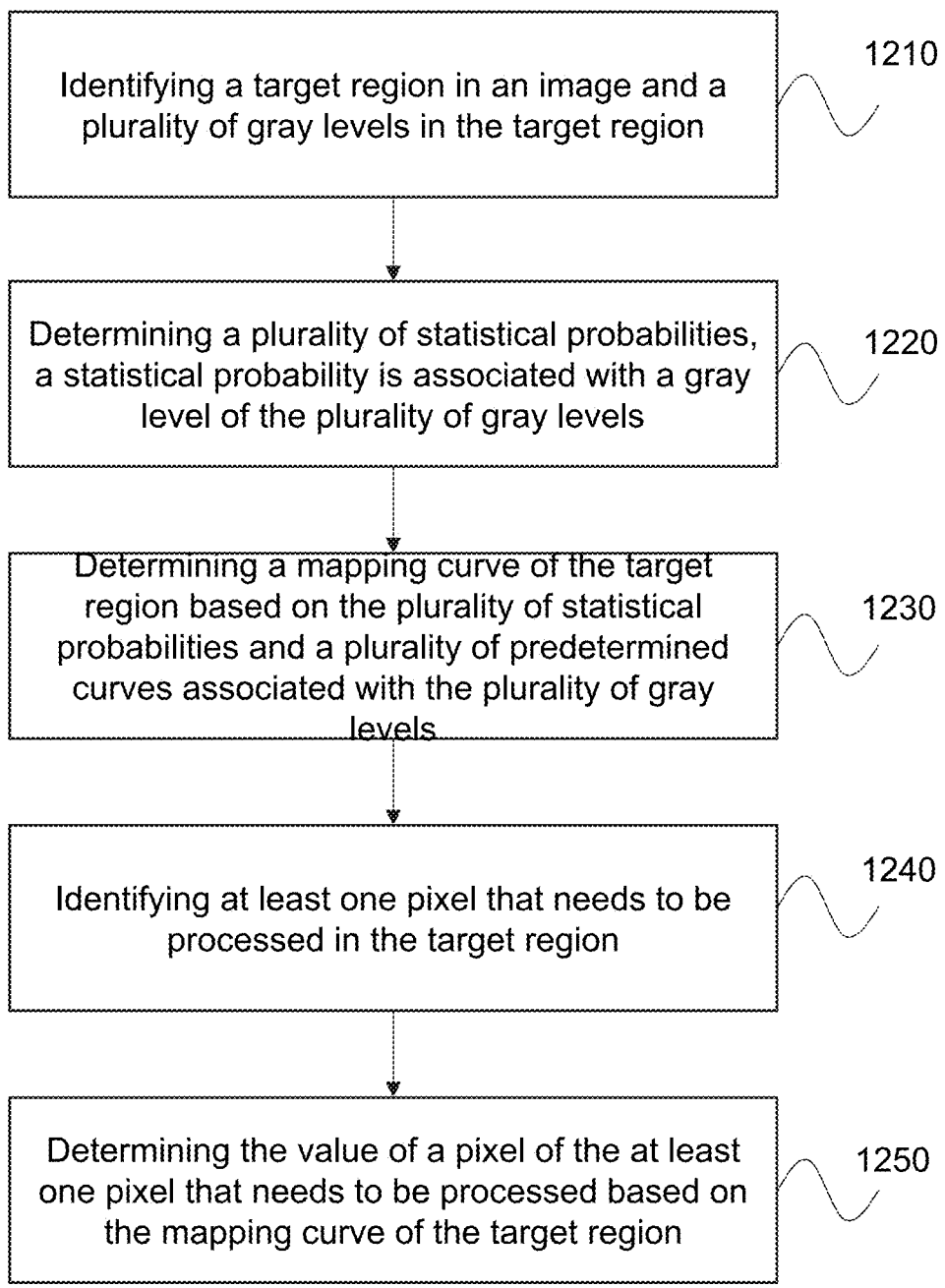
FIG. 12 is a flowchart illustrating an exemplary process for processing an image according to some embodiments of the present disclosure.

FIG. 12 is a flowchart illustrating an exemplary process 1200 for processing an image according to some embodiments of the present disclosure. In some embodiments, one or more operations of process 1200 may be implemented in the image processing system 100 illustrated in FIG. 1. For example, the process 1200 may be stored in the storage 140 in the form of instructions, and invoked and/or executed by the image processing device 120 (e.g., the processor 220 of the image processing device 120, the determination module 350 of the image processing device 120, etc.).

At 1210, a target region in an image and a plurality of gray levels in the target region may be identified.

In some embodiments, the image may be captured by one or more sensors and/or imaging devices. In some embodiments, the image may be retrieved from a storage device (e.g., the storage 140 illustrated in FIG. 1, the disk 270 illustrated in FIG. 2A) or received from an imaging device (e.g., the imaging device 110 illustrated in FIG. 1). In some embodiments, the image may be retrieved from an external source, such as a hard disk, a wireless terminal, or the like, or any combination thereof, that is connected to or otherwise communicates with the system 100. In some embodiments, the image may include gray scale data, red green blue (RGB) data, Bayer data, Luma and Chroma (YUV) data, raw image format (RAW) data, joint photographic experts group (JPEG) data, or the like, or any combination thereof. For example, the image may be a gray scale image transformed from an RGB image. In some embodiments, the image may be obtained from a finial image obtained at 650 in FIG. 6. For example, the image may include a gray scale image transformed from the final image obtained at 650.

The image may include at least one target region. The number of the target regions in the image may vary in different application scenarios. For example, the number of the target regions in the image may be determined based on the number of pixels that need to be processed in the image. A pixel that needs to be processed may be designated as the central pixel of a target region. As another example, the entire image may constitute the only one target region of the image. The size of the target region in the image may vary in different application scenarios. For example, the size of two target regions in an image may be the same or different.

The target region may include a plurality of gray levels. In some embodiments, the gray levels may include original gray levels in the target region, normalized gray levels of the original levels, or other processed gray levels. For example, the plurality of gray levels in the target region may be within a range from 0 to 1. The gray level of 0 represents white in the target region, and the gray level of 1 represents black in the target region. In some embodiments, the number of the gray levels in the target region may vary in different application scenarios. For example, the number of the gray levels in the target region may be four. In some embodiments, the number of gray levels in the target region may be determined by a user of the image processing system 100 via, for example an I/O. In some embodiments, the gray levels in a target region may be determined by the system 100 based on a default setting of the system 100, an empirical setting from prior imaging processing by the system 100 or a different system, a combination of a default setting or an empirical setting and a user input, etc. An empirical setting from prior imaging processing may be derived by, for example, machine learning. In some embodiments, the gray levels in a target region may be determined based on the range of gray values of the pixels in the target region. The four gray levels may include 0.25, 0.5, 0.75, and 1.

In some embodiments, the interval between two adjacent gray levels may be the same or different. The interval between two adjacent gray levels in the target region may vary according to different application scenarios. For example, the interval between two adjacent gray levels may be 0.25. The gray levels of the target region may include four, 0.25, 0.5, 0.75, and 1, respectively. As another example, the interval between two adjacent gray levels may be 0.2. The gray levels of the target region may include five, 0.2, 0.4, 0.6, 0.8, and 1, respectively. As still another example, the gray levels of the target region may include four, 0.1, 0.4, 0.6 and 0.9, respectively. In some embodiments, the gray levels of any two target regions in the image may be the same or different.

Figure 13:
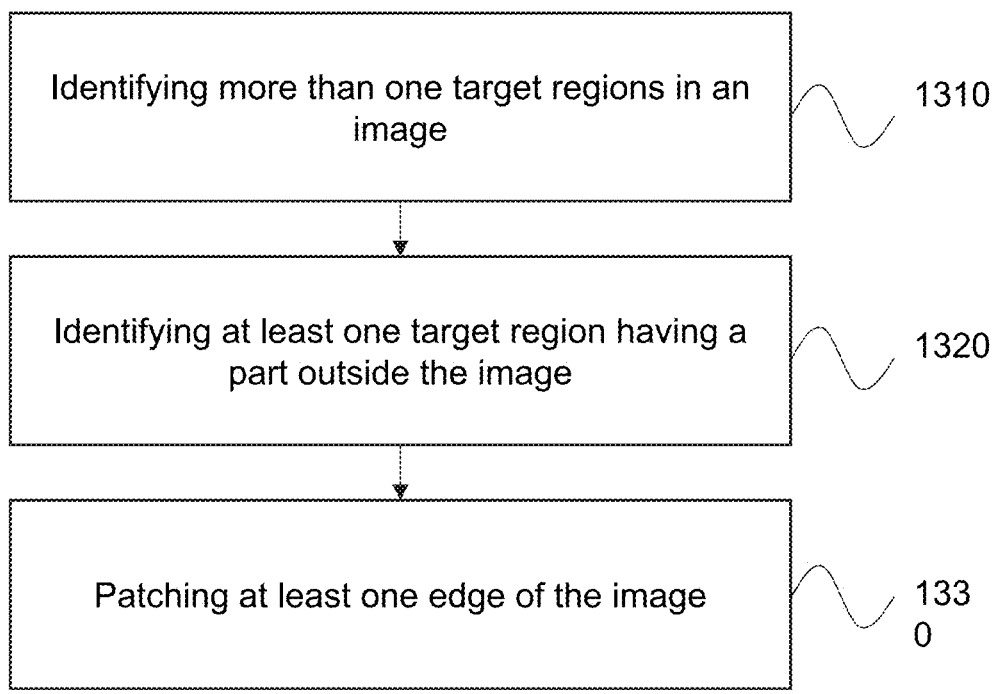
FIG. 13 is a flowchart illustrating an exemplary process for processing at least one target region having a part outside an image according to some embodiments of the present disclosure.

In some embodiments, if the image includes more than one target regions, and at least one target region has a part outside the image, the at least one target region extending outside of the image may be processed according to, for example, the process 1300 illustrated in FIG. 13 after 1210.

At 1220, a plurality of statistical probabilities may be determined, in which a statistical probability is associated with a gray level of the plurality of gray levels. In some embodiments, the plurality of statistical probabilities may be associated with all the gray levels except for the greatest gray level in the target region.

In some embodiments, a statistical probability associated with a gray level may include a proportion or number of the pixels associated with the gray value. For example, the statistical probability associated with the gray level 0.25 may include the proportion of the pixels whose gray levels are not greater than 0.25 in the target region. The proportion may be a ratio of the number of the pixels whose gray values are not greater than the gray level 0.25 to the total number of pixels in the target region. In some embodiments, the statistical probabilities may be expressed in one or more of various ways. For example, the statistical probabilities may be represented as numerical values, a diagram, a table, or the like, or any combination thereof. Exemplary diagrams may include a cumulative histogram, a line chart, a pie chart, a scatter diagram, a bar chart, or the like, or any combination thereof.

Merely by way of example, the statistical probabilities may be represented as a cumulative histogram of the gray levels. The cumulative histogram may include a horizontal axis and a vertical axis. The horizontal axis may indicate gray levels of the plurality of gray levels. For example, the horizontal axis may include all the plurality of gray levels in the target region. As another example, the horizontal axis may include all the plurality of gray levels except for the greatest gray level in the target region. The vertical axis may indicate the proportions of pixels whose gray values are not greater than the corresponding gray levels in the horizontal axis.

At 1230, a mapping curve of the target region may be determined based on the plurality of statistical probabilities and a plurality of predetermined curves associated with the plurality of gray levels. In some embodiments, the mapping curve of the target region may be determined based on the plurality of statistical probabilities of the plurality of gray levels except for the greatest gray level and the plurality of predetermined curves associated with the plurality of gray levels except for the greatest gray level. Exemplary processes for determining a mapping curve of the target region may be found elsewhere in the present disclosure. See, for example, FIG. 16 and the description thereof.

In some embodiments, the predetermined curves associated with the plurality of the gray levels may vary in different application scenarios of the image processing system 100. The predetermined curve associated with various gray levels may be the same or different. Merely by way of example, the predetermined curves may include a Gaussian distribution curve, a Weibull distribution curve, an exponential distribution curve, a Poisson distribution curve, a binomial distribution curve, or the like, or any combination thereof.

At 1240, at least one pixel that needs to be processed in the target region may be identified.

In some embodiments, the pixels that needs to be processed may be determined manually, automatically, and/or semi-automatically. For example, the pixel in the center of the target region may need to be processed. As another example, all the pixels in the target region may need to be processed. As a further example, in the target region, the pixels whose gray values are lower or higher than a predetermined value may be determined to be processed.

At 1250, for a pixel of the at least one pixel that needs to be processed, the value of the pixel may be determined based on the mapping curve of the target region. In some embodiments, a processed image may be generated based on the determined at least one value of the at least one pixel.

For example, the mapping curve may be expressed in the form of a formula. The value of a pixel may be determined based on the formula. It should be noted that the above description of process 1200 is merely provided for the purposes of illustration, and not intended to be understood as the only embodiment. For persons having ordinary skills in the art, various variations and modifications may be conduct under the teaching of some embodiments of the present disclosure. For example, at least one pixel that needs to be processed may be first identified (e.g., at 1240) before the target region (e.g., at 1210) is identified. The target region may be identified based on the at least one pixel that needs to be processed in the image. However, those variations and modifications may not depart from the protecting of some embodiments of the present disclosure.

FIG. 13 is a flowchart illustrating an exemplary process 1300 for processing at least one target region having a part outside of an image according to some embodiments of the present disclosure. In some embodiments, one or more operations of process 1300 may be implemented in the image processing system 100 illustrated in FIG. 1. For example, the process 1300 may be stored in the storage 140 in the form of instructions, and invoked and/or executed by the image processing device 120 (e.g., the processor 220 of the image processing device 120, the determination module 350 of the image processing device 120, etc.).

At 1310, more than one target region in an image may be identified. In some embodiments, the image may be captured by one or more sensors and/or imaging devices. In some embodiments, the image may be retrieved from a storage device (e.g., the storage 140 illustrated in FIG. 1, the disk 270 illustrated in FIG. 2A) or received from an imaging device (e.g., the imaging device 110 illustrated in FIG. 1). In some embodiments, the image may be retrieved from an external source, such as a hard disk, a wireless terminal, or the like, or any combination thereof, that is connected to or otherwise communicating with the system 100. In some embodiments, the image may include gray scale data, red green blue (RGB) data, Bayer data, Luma and Chroma (YUV) data, raw image format (RAW) data, joint photographic experts group (JPEG) data, or the like, or any combination thereof. For example, the image may include a gray scale image transformed from an RGB image. In some embodiments, the image may be obtained from a finial image obtained at 650 in FIG. 6. For example, the image may include a gray scale image transformed from the final image obtained at 650.

The number of the target regions in the image may vary in different application scenarios. For example, the number of the target regions in the image may be determined based on the number of pixels that need to be processed in the image. Each pixel that needs to be processed may be the pixel located at the center of a target region. The size of the target region in the image may vary in different application scenarios. For example, the sizes of two target regions in the image may be the same or different.

At 1320, a determination may be made as to whether at least one target region has a part outside of the image. In some embodiments, the pixels that needs to be processed may be the pixels located at the center of the corresponding target region. When there is at least one pixel located on an edge or at a corner of the image, the corresponding target region may have a part outside the image.

At 1330, at least one edge of the image may be processed in response to the determination that at least one target region has a part outside the image.

Exemplary processes for patching at least one edge of an image may be found elsewhere in the present disclosure. See, for example, FIG. 14-I through FIG. 14-V and FIG. 15-I through FIG. 15-V, or any combination thereof.

In some embodiments, in response to a determination that no target region has a part outside the image at 1320, the process 1200 described in FIG. 12 may be implemented on each of the identified target regions in the image at 1310 to process the image. In some embodiments, in response to a determination that at least one target region has a part outside the image, the process 1200 described in FIG. 12 may be implemented on the at least one processed target region obtained after 1330.

FIGS. 14-I through 14-V are schematic diagrams illustrating the patching of at least one edge of an image according to some embodiments of the present disclosure.

FIG. 14-I shows an image A that needs to be processed. The image A may include a plurality of pixels arranged in rows and columns. For example, the number of pixels in each row is W, and the number of pixels in each column is H, where W and H are positive integers. Firstly, two sections named as First Section and Second Section may be identified in the image A. The First Section may be located on the leftmost side of the image A. The number of pixels in each row of the First Section may be W/2, and the number of pixels in each column of the First Section may be equal to the number of pixels in each column of the image A. The Second Section may be located on the rightmost side of the image A. The number of pixels in each row of the Second Section may be W/2, and the number of pixels in each column of the Second Section may be equal to the number of pixels in each column of the image A. FIG. 14-II illustrates the locations of the First Section and the Second Section.

Secondly, the First Section may be mirrored with the left edge of the image A as a symmetry axis, and the Second Section may be mirrored with the right edge of the image A as a symmetry axis. FIG. 14-III illustrates an image B which is generated by the mirroring of the First Section and the Second Section. Thirdly, two sections named as Third Section and Fourth Section may be identified in the image B. The Third Section may be located at the top of the image B. The number of pixels in each column of the Third Section may be H/2, and the number of pixels in each row of the Third Section may be equal to the number of pixels in each row of the image B. The Fourth Section may be located at the bottom of the image B. The number of pixels in each column of the Fourth Section may be H/2, and the number of pixels in each row of the Fourth Section may be equal to the number of pixels in each raw of the image B. FIG. 14-IV illustrates the locations of the Third Section and the Fourth Section. Fourthly, the Third Section may be mirrored with the top edge of the image B as a symmetry axis, and the Fourth Section may be mirrored with the bottom edge of the image B as a symmetry axis. FIG. 14-V illustrates an image C which is generated by the mirroring of the Third Section and the Fourth Section. In some embodiments, at least one target region may be identified in the processed image C as illustrated in FIG. 14-V. It should be noted that the steps for patching the image described above may be implemented in a different order. For example, the top and bottom sections of the image may be patched before the left and right sections are patched.

In some embodiments, for any one pixel in the image, the target region may include a predetermined area having the pixel in the center (the pixel being as the central pixel). For example, the target region may include a W*H of region centered at the pixel 1. The pixel 1 represents the central pixel, W represents the number of pixels in a row of the target region, and H represents the number of pixels in a column of the target region.

FIGS. 15-I through 15-V illustrate schematic diagrams for patching at least one edge of an image according to some embodiments of the present disclosure. FIGS. 15-I through 15-V illustrate the cases that a part of a target region is inside the image (a part outside the image).

In FIG. 15-I, an X axis and a Y axis may divide the target region having the shape of a rectangle enclosed by the solid lines into four sections according to the center of the target region (e.g., the center of the target region is the original of the coordinate system including the X axis and the Y axis). It is understood that a target region may have a shape other than a rectangle. The four sections may be respectively named as Section A, Section B, Section C, and Section D. The Section A is inside the image, and the Section B, the Section C, and the Section D are outside the image. The pixels in the Section A may be mirrored to generate the pixels in the Section B with the X axis as a symmetry axis. The pixels in the Section A and the Section B may be mirrored to generate pixels in the Section C and the Section D with the Y axis as a symmetry axis.

In FIG. 15-II, an X axis and a Y axis may divide the target region into four sections (Section A, Section B, Section C, and Section D) according to the center of the target region (e.g., the center of the target region is the original point of the X axis and the Y axis). The Section B may include a part (B1) outside the image and a part (B2) inside the image. The Section A1 is symmetrical to the Section B1. The pixels in the Section A1 may be mirrored to generate the pixels in the Section B1 with the X axis as a symmetry axis. The pixels in the Section A and the Section B may be mirrored to generate the pixels in the Section D and the Section C with the Y axis as a symmetry axis.

In FIG. 15-III, an X axis may divide the target region into two sections (Section A and Section B) based on the center of the target region. The pixels in the Section A may be mirrored to generate the pixels in the Section B with the X axis as a symmetry axis.

In FIG. 15-IV, an X axis may divide the target region into two sections (Section A and Section B) based on the center of the target region. The Section B may include a part (B1) outside the image and a part (B2) inside the image. The Section A1 is symmetrical to the Section B1. The pixels in the Section A1 may be mirrored to generate the pixels in the Section B1 with the X axis as a symmetry axis.

In some embodiments, other cases (e.g., the case illustrated in FIG. 15-V) may be patched based on the same or similar techniques described in FIGS. 15-I through 15-IV.

FIG. 16 is a flowchart illustrating an exemplary process 1600 for determining a mapping curve of a target region according to some embodiments of the present disclosure. In some embodiments, one or more operations of process 1600 may be implemented in the image processing system 100 illustrated in FIG. 1. For example, the process 1600 may be stored in the storage 140 as a form of instructions, and invoked and/or executed by the image processing device 120 (e.g., the processor 220 of the image processing device 120, the determination module 350 of the image processing device 120, etc.).

At 1610, a plurality of optimal coefficients may be determined. An optimal coefficient may be associated with a statistical probability of the plurality of statistical probabilities relating to the target region.

In some embodiments, an optimal coefficient associated with a statistical probability may be determined based on the statistical probability of a gray level, a predetermined range of the statistical probability corresponding to the gray level (e.g., the gray level is not the greatest gray level in the target region), the pixel value of the central pixel of the target region, the pixel values of neighbor pixels around the central pixel, or the like, or any combination thereof. The predetermined range of the statistical probability may vary in different application scenarios of the image processing system 100. A neighbor pixel of a certain pixel may be within a range (e.g., a square region with an area of 3 pixels*3 pixels centered at the central pixel) of the pixel. Exemplary processes for determining an optimal coefficient may be described may be found elsewhere in the present disclosure. See, for example, FIG. 17 and the description thereof.

At 1620, a plurality of optimal curves may be determined. An optimal curve may be associated with an optimal coefficient of the plurality of optimal coefficients.

In some embodiments, an optimal curve may be determined based on the corresponding optimal coefficient. In some embodiments, the optimal curves of different gray levels in the target region may be the same or different. For instance, an optimal curve may be determined based on the equation (6):

$$Y_{out} = (2^n - 1) \times \left(\frac{Y_{in}}{2^n - 1}\right)^{W'}, \tag{6}$$

where $Y_{out}$ denotes an output pixel value, $Y_{in}$ denotes an input pixel value, n denotes the bit width of the image, W' denotes an optimal coefficient. In some embodiments, when W' is the Gamma value, the optimal curve may be a Gamma distribution curve.

At 1630, a plurality of predetermined curves associated with the plurality of optimal coefficients may be identified. In some embodiments, a predetermined curve may correspond to a gray level except for the greatest gray level. The predetermined curves associated with different gray level may be the same or different. Merely by way of example, the predetermined curves may include a Gaussian distribution curve, a Weibull distribution curve, an exponential distribution curve, a Poisson distribution curve, a binomial distribution curve, or the like, or any combination thereof.

At 1640, a mapping curve of the target region may be determined based on the plurality of optimal curves and the plurality of predetermined curves.

In some embodiments, a plurality of sub mapping curves may be determined before the mapping curve is determined. A sub mapping curve may correspond to a gray level except for the greatest gray level. The sub mapping curves may be determined based on the optimal curves and the predetermined curves. In some embodiments, a sub mapping curve, which corresponds to a gray level, may be determined based on the optimal curve corresponding to the gray level and the predetermined curve corresponding to the gray level.

In some embodiments, the mapping curve of the target region may be determined based on all or a portion of the plurality of sub mapping curves of the target region. For example, the mapping curve may be determined as a sum of all the plurality of sub mapping curves.

Figure 17:
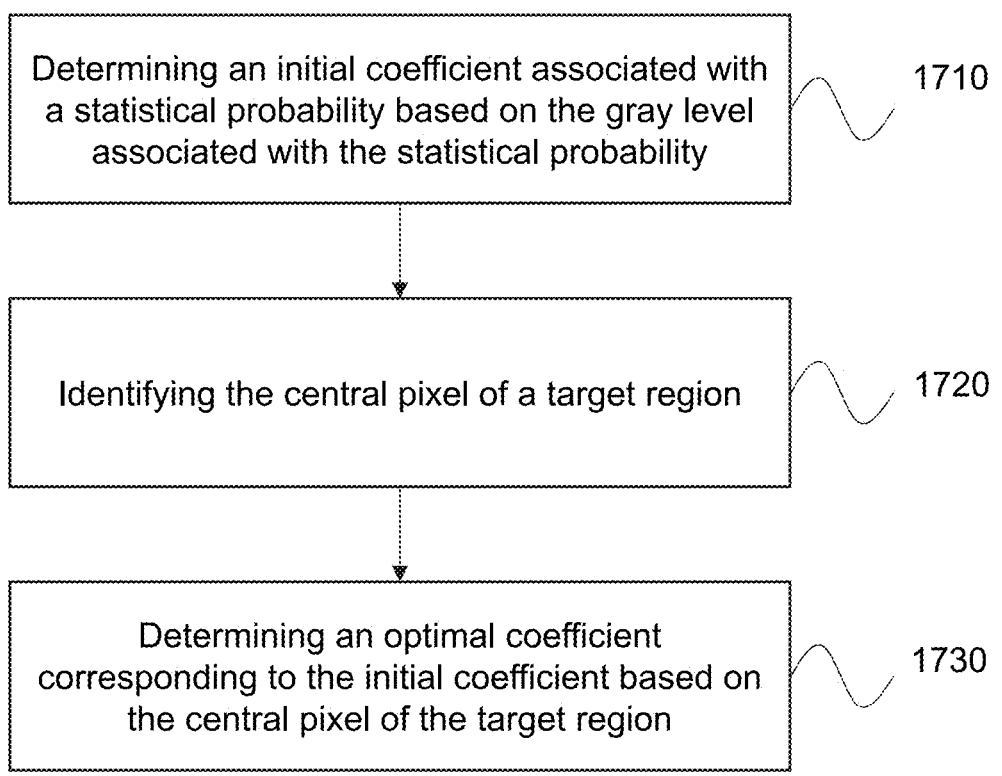
FIG. 17 is a flowchart illustrating an exemplary process for determining an optimal coefficient of a target region according to some embodiments of the present disclosure.

FIG. 17 is a flowchart illustrating an exemplary process 1700 for determining an optimal coefficient of a target region according to some embodiments of the present disclosure. In some embodiments, one or more operations of process 1700 may be implemented in the image processing system 100 illustrated in FIG. 1. For example, the process 1700 may be stored in the storage 140 in the form of instructions, and invoked and/or executed by the image processing device 120 (e.g., the processor 220 of the image processing device 120, the determination module 350 of the image processing device 120, etc.).

At 1710, an initial coefficient associated with a statistical probability may be determined based on the gray level associated with the statistical probability. The initial coefficient may be used to describe a factor in the process for determining an optimal coefficient of a target region.

In some embodiments, the initial coefficient corresponding to a gray level may be determined based on the gray level, the statistical probability associated with the gray level, and a predetermined range of the statistical probability associated with the gray level. The predetermined range of a statistical probability associated with the gray level may vary in different application scenarios of the image processing system 100. For example, the predetermined range of the statistical probability associated with a gray level may be predetermined by a user of the image processing system 100 via, for example, the I/O 250. In some embodiments, the predetermined range of the statistical probability associated with a gray level may be determined by the system 100 based on a default setting of the system 100, an empirical setting from prior imaging processing by the system 100 or a different system, a combination of a default setting or an empirical setting and a user input, etc. An empirical setting from prior imaging processing may be derived by, for example, machine learning. Exemplary processes for determining an initial coefficient may be found elsewhere in the present disclosure. See, for example, FIG. 18 and the description thereof.

At 1720, the central pixel of the target region may be identified.

At 1730, an optimal coefficient corresponding to the initial coefficient may be determined based on the central pixel of the target region. In some embodiment, the optimal coefficient may be determined by different ways when the gray level corresponding to the initial coefficient is within different ranges.

In some embodiments, in response to a determination that the gray level corresponding to the initial coefficient is less than a first threshold, the optimal coefficient corresponding to the initial coefficient may be determined based on the pixel value of the central pixel of the target region and the pixel values of neighbor pixels around the central pixel. In some embodiments, the first threshold associated with a gray level may be determined by the system 100 based on a default setting of the system 100, an empirical setting from prior imaging processing by the system 100 or a different system, a combination of a default setting or an empirical setting and a user input, etc. An empirical setting from prior imaging processing may be derived by, for example, machine learning. The first threshold may be predetermined within (0, 1). For example, the first threshold may be within (0.25, 0.75). As another example, the first threshold may be 0.5. A neighbor pixel of a certain pixel may be within a certain range (e.g., a region with an area of L pixels in a row, M pixels in a column, and centered with the central pixel) from the pixel. The neighbor pixels may be the pixels in the neighbor region of the central pixel of the target region. For instance, the optimal coefficient may be determined based on the exemplary equation (7):

$$W'=W\times m, \quad (7)$$

where W denotes the initial coefficient, W' denotes the optimal coefficient corresponding to the initial coefficient, and m denotes the ratio of the average pixel value of the neighbor pixels to the pixel value of the central pixel. In some embodiments, the m may be determined based on the equation (8):

$$m=b_1/a_1, \quad (8)$$

where $b_1$ denotes the average pixel value of the neighbor pixels, and $a_1$ denotes the pixel value of the central pixel.

Merely by way of example, in response to the determination that m<1, the pixel value of the central pixel may be greater than the average pixel value of the neighbor pixels. The optimal coefficient may be adjusted to be less than the initial coefficient. As another example, in response to the determination that m>1, the pixel value of the central pixel may be less than the average pixel value of the neighbor pixels. The optimal coefficient may be adjusted to be greater than the initial coefficient.

In some embodiments, in response to the determination that the initial coefficient is not less than the first threshold, the optimal coefficient corresponding to the initial coefficient may be determined based on the pixel value of the central pixel of the target region. For instance, the optimal coefficient may be determined based on the equation (9):

$$W'=W\times(1+pix\_value), \quad (9)$$

where W denotes the initial coefficient, W' denotes optimal coefficient corresponding to the initial coefficient, and pix_value denotes the normalized pixel value of the central pixel of the target region. The pix_value is within the range from 0 to 1. Exemplary algorithms for normalizing the pixel value of the central pixel may include a Min-Max normalized algorithm, a z-score normalized algorithm, a decimal scaling normalized algorithm, or the like, or any combination thereof.

Figure 18:
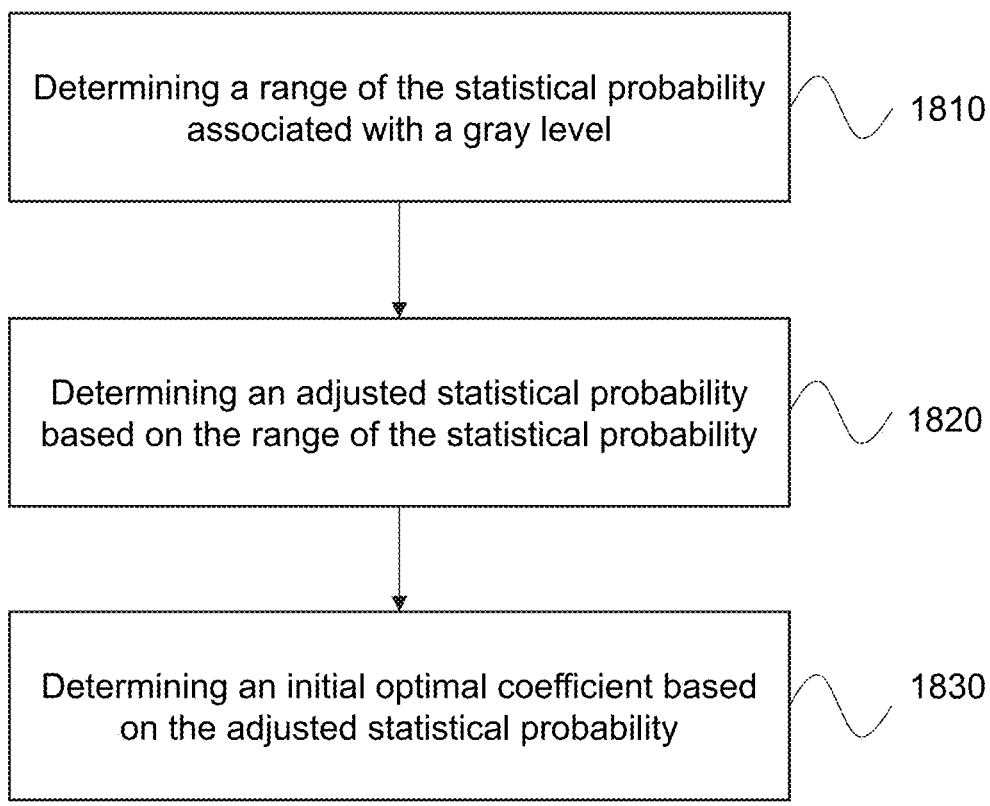
FIG. 18 is a flowchart illustrating an exemplary process for determining an initial optimal coefficient of a target region according to some embodiments of the present disclosure.

FIG. 18 is a flowchart illustrating an exemplary process 1800 for determining an initial optimal coefficient of a target region according to some embodiments of the present disclosure. In some embodiments, one or more operations of process 1800 may be implemented in the image processing system 100 illustrated in FIG. 1. For example, the process 1800 may be stored in the storage 140 in the form of instructions, and invoked and/or executed by the image processing device 120 (e.g., the processor 220 of the image processing device 120, the determination module 350 of the image processing device 120, etc.).

At 1810, a range of the statistical probability associated with a gray level may be determined. For example, the range of the statistical probability associated with a gray level may be determined manually by a user of the image processing system 100 via, for example, the I/O 250. In some embodiments, the range of the statistical probability associated with a gray level may be determined by the system 100 based on a default setting of the system 100, an empirical setting from prior imaging processing by the system 100 or a different system, a combination of a default setting or an empirical setting and a user input, etc. An empirical setting from prior imaging processing may be derived by, for example, machine learning.

Merely by way of example, four gray levels may be determined as 0.25, 0.5, 0.75, and 1. The statistical probabilities associated with the first three gray levels (except for the greatest gray level) may be $P_{ys}$, $P_{ym}$, and $P_{yh}$, respectively. The range of the statistical probabilities associated with the first three gray levels may be predetermined as [0.01, 0.35], [0.35, 0.65], and [0.65, 0.95], respectively. The statistical probabilities $P_{ys}$ associated with gray level 0.25 may be adjusted based on the range [0.01, 0.35], the statistical probabilities $P_{ym}$ associated with gray level 0.5 may be adjusted based on the range [0.35, 0.65], and the statistical probabilities $P_{yh}$ associated with gray level 0.75 may be adjusted based on the range [0.65, 0.95].

In some embodiments, the range of the statistical probability may be determined automatically. For example, the range of the statistical probability associated with a gray level may be determined based on the equation (10) and the equation (11):

$$max=bin+k_1, \quad (10)$$

$$min=bin+k_2, \quad (11)$$

where max denotes the maximum of the range, min denotes the minimum of the range, and 0<min<max<1; bin denotes the normalized gray level, and 0≤bin≤1; $k_1$ and $k_2$ denote empirical coefficients, and $k_1>k_2$. The empirical coefficients $k_1$ and $k_2$ may be vary in different application scenarios. In some embodiments, $k_1$ and $k_2$ may be determined by the system 100 based on a default setting of the system 100, an empirical setting from prior imaging processing by the system 100 or a different system, a combination of a default setting or an empirical setting and a user input, etc. An empirical setting from prior imaging processing may be derived by, for example, machine learning. In some embodiments, $k_1$ and $k_2$ corresponding to the different gray levels may be the same or different.

At 1820, an adjusted statistical probability may be determined based on the range of the statistical probability. For example, the adjusted statistical probability may be determined based on the exemplary equation (12):

$$P_y'=min+(max-min)\times P_y, \quad (12)$$

where $P_y'$ denotes the adjusted statistical probability, $P_y$ denotes the statistical probability, max denotes the maximum of the range, and min denotes the minimum of the range.

At 1830, an initial coefficient may be determined based on the adjusted statistical probability. For example, the initial coefficient may be determined based on the equation (13):

$$W=\log(P_y')/\log(bin), \quad (13)$$

where W denotes the initial coefficient; $P_y'$ denotes the adjusted statistical probability; and bin denotes the normalized gray level, and 0≤bin≤1.

FIG. 19 is a flowchart illustrating an exemplary process 1900 for determining a mapping curve of a target region according to some embodiments of the present disclosure. In some embodiments, one or more operations of process 1900 may be implemented in the image processing system 100 illustrated in FIG. 1. For example, the process 1900 may be stored in the storage 140 in the form of instructions, and invoked and/or executed by the image processing device 120

(e.g., the processor 220 of the image processing device 120, the determination module 350 of the image processing device 120, etc.).

At 1910, for each gray level of the plurality of gray levels in a target region, a sub mapping curve associated with the gray level may be determined based on an optimal curve associated with the gray level and a predetermined curve associated with the gray level. In some embodiments, a plurality of sub mapping curves associated with the plurality of gray levels except for the greatest gray level may be determined. In some embodiments, a predetermined curve may be associated with a gray level. The predetermined curves associated with different gray levels may be the same or different. For example, the predetermined curve may be predetermined manually by a user of the image processing system 100 via, for example, the I/O 250. In some embodiments, the predetermined curve may be determined by the system 100 based on a default setting of the system 100, an empirical setting from prior imaging processing by the system 100 or a different system, a combination of a default setting or an empirical setting and a user input, etc. An empirical setting from prior imaging processing may be derived by, for example, machine learning. Exemplary predetermined curves may include a Gaussian distribution curve, a Weibull distribution curve, an exponential distribution curve, a Poisson distribution curve, a binomial distribution curve, or the like, or any combination thereof.

At 1910, a mapping curve may be determined based on the plurality of the sub mapping curves associated with the plurality of gray levels. In some embodiments, the mapping curve may be the sum of all the sub mapping curves. For example, the mapping curve may be determined based on the equation (14):

$$Y_{out} = G_1(Y_{in}) \times B_1(Y_{in}) + G_2(Y_{in}) \times B_2(Y_{in}) + \ldots + G_{n-1}(Y_{in}) \times B_{n-1}(Y_{in}), \quad (14)$$

where $Y_{in}$ denotes an input pixel value of a pixel that needs to be processed; $Y_{out}$ denotes an output pixel value of the pixel that needs to be processed; $G_1, G_2, \ldots, G_{n-1}$ denote respective optimal curves corresponding to each of the plurality of gray levels except for the greatest gray level; and $B_1, B_2, \ldots, B_{n-1}$ denote respective predetermined curves corresponding to each of the plurality of gray levels except for the greatest gray level. For a same pixel value $Y_{in}$, the sum of $B_1(Y_{in}), B_2(Y_{in}), \ldots, B_{n-1}(Y_{in})$ may be 1.

Figure 20:
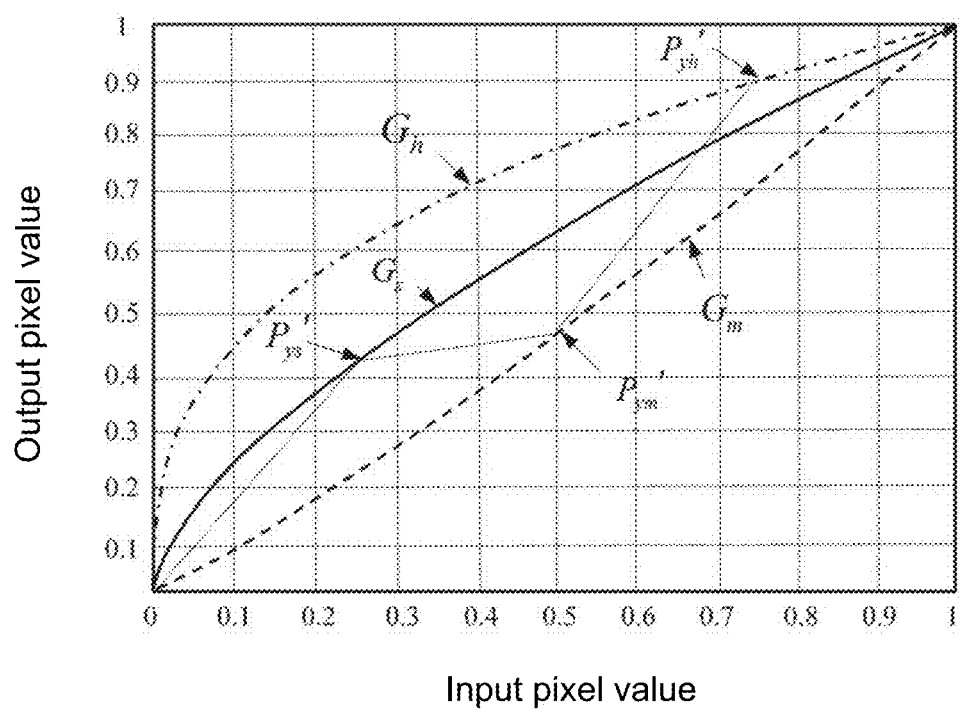
FIG. 20 is a schematic diagram illustrating exemplary optimal gamma curves according to some embodiments of the present disclosure.
Figure 21:
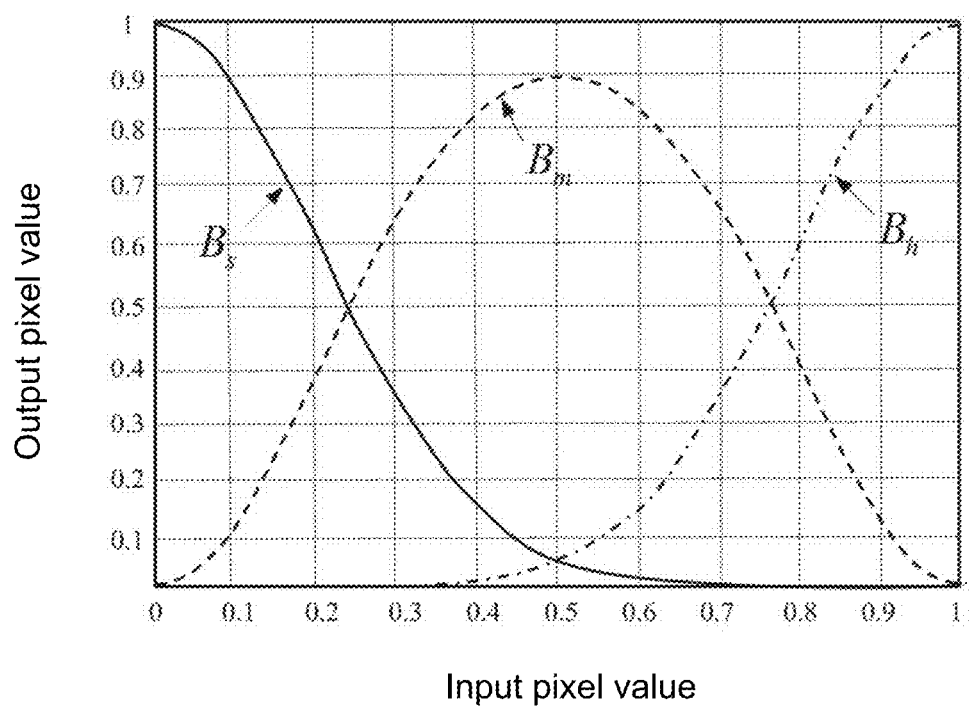
FIG. 21 is a schematic diagram illustrating exemplary Gaussian weight curves according to some embodiments of the present disclosure.
Figure 22:
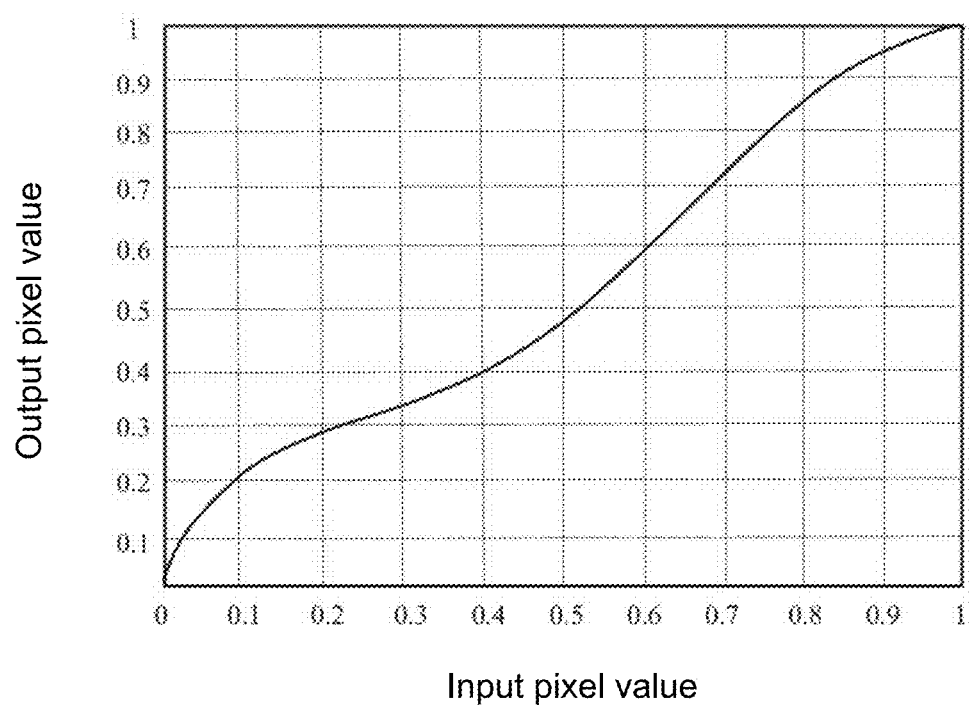
FIG. 22 is a schematic diagram illustrating an exemplary mapping curve according to some embodiments of the present disclosure.

For illustration purposes, schematic diagrams illustrating exemplary curves generated during processing the image may be found in FIGS. 20-22. Merely by way of example, the initial coefficient associated with the statistical probability may be an initial gamma value. The initial gamma value may be determined based on the equation (15):

$$\text{initial gamma\_value} = \log(P_y')/\log(\text{bin}), \quad (15)$$

where initial gamma_value denotes the initial gamma coefficient; $P_{y'}$ denotes the adjusted statistical probability; bin denotes the normalized gray level, and $0 \leq \text{bin} \leq 1$.

An optimal gamma value may be determined based on the initial gamma coefficient associated with the gray level, the central pixel of the target region, the neighbor pixels around the central pixel, or any combination thereof. The term "optimal" is used herein for describing a gamma value only.

In some embodiments, in response to the determination that the gray level corresponding to the initial gamma coefficient is less than the first threshold, the optimal gamma value corresponding to the initial coefficient may be determined based on the initial gamma coefficient associated with the gray level, the pixel value of the central pixel of the target region, and the pixel values of neighbor pixels around the central pixel. For instance, the optimal coefficient may be determined based on the equation (16):

$$\text{gamma\_value}' = \text{initial gamma\_value} \times m, \quad (16)$$

where gamma_value' denotes to the optimal gamma value, initial gamma_value denotes to the initial gamma coefficient, and m denotes the ratio of the average pixel value of the neighbor pixels to the pixel value of the central pixel. In response to the determination that m<1, the pixel value of the central pixel may be greater than the average pixel value of the neighbor pixels. The optimal coefficient may be adjusted to be less than the initial gamma coefficient. As another example, in response to the determination that m>1, the pixel value of the central pixel may be less than the average pixel value of the neighbor pixels. The optimal gamma coefficient may be adjusted to be greater than the initial gamma coefficient In some embodiments, in response to determining that the gray level corresponding to the initial gamma coefficient is not less than the first threshold, the optimal gamma value corresponding to the initial coefficient may be determined based on the initial gamma coefficient associated with the gray level and the pixel value of the central pixel of the target region. The optimal coefficient may be determined based on the equation (17):

$$\text{gamma\_value}' = \text{initial gamma\_value} \times (1 + \text{pix\_value}), \quad (17)$$

where gamma_value' denotes to the optimal gamma value associated with a gray level, initial gamma_value denotes to the initial gamma coefficient associated with the gray level, and pixel_value denotes to normalized pixel value of the central pixel of the target region. The pix_value is within the range from 0 to 1. Exemplary technique for normalizing the pixel value of the central pixel may include a Min-Max normalized technique, a z-score normalized technique, a decimal scaling normalized technique, or the like, or any combination thereof.

The gamma curve associated with a gray level may be determined based on the corresponding optimal gamma value, and determined based on the equation (18):

$$Y_{out} = (2^n - 1) \times \left(\frac{Y_{in}}{2^{n-1}}\right)^{\text{gamma\_value}'}, \quad (18)$$

where $Y_{out}$ denotes an output pixel value, $Y_{in}$ denotes an input pixel value, n denotes the bit width of the image, gamma_value' denotes an optimal gamma value.

FIG. 20 is a schematic diagram illustrating exemplary optimal gamma curves according to some embodiments of the present disclosure. For illustration purpose, there gamma curves of $G_s$ (a gamma curve associated with a shadow gray level of the target region), $G_m$ (a gamma curve associated with a middle gray level of the target region) and $G_h$ (a gamma curve associated with a high gray level of the target region) may be determined based on the equation (18). The term "shadow", "middle" and "high" may refer to different gray levels of the target region. For example, the gamma curve $G_s$ may be associated with a gray level of 0.25 in the target region; the gamma curve Gm may be associated with a gray level of 0.5 in the target region; and the gamma curve $G_h$ may be associated with a gray level of 0.75 in the target region. The statistical probability $P_{ys'}$ associated with the gray level of 0.25 may be adjusted based on the gamma curve $G_s$. The statistical probability $P_{ym'}$ associated with the gray level of 0.5 may be adjusted based on the gamma curve $G_m$. The statistical probability $P_{yh}$, associated with the gray level of 0.75 may be adjusted based on the gamma curve $G_h$.

The mapping curve of the target region may be determined based the three gamma curves of $G_s$, $G_m$ and $G_h$, and three corresponding Gaussian weight curves of $B_s$, $B_m$ and $B_h$. FIG. 21 is a schematic diagram illustrating exemplary Gaussian weight curves according to some embodiments of the present disclosure. The Gaussian weight curve $B_s$ may be associated with the shadow gray level of the target region; the Gaussian weight curve $B_m$ may be associated with the middle gray level of the target region; and the Gaussian weight curve $B_h$ may be associated with the high gray level of the target region. For example, the Gaussian weight curve $B_s$ may be associated with the gray level of 0.25 in the target region; the Gaussian weight curve $B_m$ may be associated with the gray level of 0.5 in the target region; and the Gaussian weight curve $B_h$ may be associated with the gray level of 0.75 in the target region.

The mapping curve of the target region may be determined based on the equation (19):

$$Y_{out}=G_s(Y_{in})\times B_s(Y_{in})+G_m(Y_{in})\times B_m(Y_{in})+G_h(Y_{in})\times B_h(Y_{in}), \quad (19)$$

where $Y_{in}$ denotes an input pixel value of a pixel that needs to be processed; $Y_{out}$ denotes an output pixel value of the pixel that needs to be processed; $G_s$, $G_m$ and $G_h$ denotes three gamma curves; and $B_s$, $B_m$ and $B_h$ denotes three Gaussian weight curves. FIG. 22 is a schematic diagram illustrating an exemplary mapping curve according to some embodiments of the present disclosure. The pixel value of a pixel that needs to be processed may be adjusted based on the mapping curve as illustrated in FIG. 22.

FIG. 23 is a flowchart illustrating an exemplary process of processing an image according to some embodiments of the present disclosure. In some embodiments, one or more operations of process 2300 may be implemented in the image processing system 100 illustrated in FIG. 1. For example, the process 2300 may be stored in the storage 140 as a form of instructions, and invoked and/or executed by the image processing device 120 (e.g., the processor 220 of the image processing device 120, the determination module 350 of the image processing device 120, etc.).

At 2310, a first luminance image of an original image may be obtained. The first luminance image of the original image may be obtained by determining luminance of each pixel in the original image. In some embodiments, the original image may be captured by one or more sensors and/or imaging devices. In some embodiments, the original image may be retrieved from a storage device (e.g., the storage 140 illustrated in FIG. 1, the disk 270 illustrated in FIG. 2A) or received from an imaging device (e.g., the imaging device 110 illustrated in FIG. 1). In some embodiments, the original image may be retrieved from an external source, such as a hard disk, a wireless terminal, or the like, or any combination thereof, that is connected to or otherwise communicates with the system 100. In some embodiments, the original image may include red green blue (RGB) data, Bayer data, Luma and Chroma (YUV) data, raw image format (RAW) data, joint photographic experts group (JPEG) data, or the like, or any combination thereof.

At 2320, the first luminance image of the original image may be decomposed to obtain a plurality of first decomposed images (or referred to as unadjusted decomposed images). In some embodiments, the decomposition of the first luminance image of the original image may be performed by the decomposition module 320 as illustrated in FIG. 3. In some embodiments, the method of decomposing the first luminance image of the original image may be described as 620 of process 600 in FIG. 6 in the present disclosure.

At 2330, a plurality of second (or frequency-adjusted) decomposed images may be determined based on the plurality of first (or unadjusted) decomposed images. In some embodiments, one or more frequency adjustment operations for determining the second (or frequency-adjusted) decomposed images may be performed by the frequency adjustment module 330 as illustrated in FIGS. 3 and 4. In some embodiments, the method of determining the plurality of second decomposed images may be described as 630 of process 600 in FIG. 6 in the present disclosure.

At 2340, a second (or frequency-adjusted) luminance image of the original image may be reconstructed based on the plurality of second (or frequency-adjusted) decomposed images. In some embodiments, one or more operations of reconstructing the second luminance image may be performed by the reconstruction module 340 as illustrated in FIG. 3. In some embodiments, the method of reconstructing the second luminance image may be described as 640 of process 600 in FIG. 6 in the present disclosure.

At 2350, a final image of the original image may be determined based on the first (or unadjusted) luminance image, the second (or frequency-adjusted) luminance image, and the original image. In some embodiments, one or more operations of determining the final image of the original image may be performed by the determination module 350 as illustrated in FIG. 3. In some embodiments, the method of determining the final image of the original image may be described as 650 of process 600 in FIG. 6 in the present disclosure.

At 2360, a target region in the final image and a plurality of gray levels in the target region may be identified. In some embodiments, the method of identifying the target region and the plurality of gray levels may be described as 1210 of process 1200 in FIG. 12 in the present disclosure.

At 2370, a plurality of statistical probabilities may be determined, in which a statistical probability is associated with a gray level of the plurality of gray levels. In some embodiments, the method of determining the plurality of statistical probabilities may be described as 1220 of process 1200 in FIG. 12 in the present disclosure.

At 2380, a mapping curve of the target region may be determined based on the plurality of statistical probabilities and a plurality of predetermined curves associated with the plurality of gray levels. In some embodiments, the method of determining the mapping curve of the target region may be described as 1230 of process 1200 in FIG. 12 in the present disclosure.

At 2390, at least one pixel that needs to be processed in the target region may be identified. In some embodiments, the method of identifying the at least one pixel that needs to be processed in the target region may be described as 1240 of process 1200 in FIG. 12 in the present disclosure.

At 2395, the value of a pixel that needs to be processed may be determined based on the mapping curve of the target region. In some embodiments, the method of determining the value of the at least one pixel that needs to be processed may be described as 1250 of process 1200 in FIG. 12 in the present disclosure.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "decomposing," "obtaining," "storing," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

In some implementations, any suitable computer readable media may be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in connectors, conductors, optical fibers, circuits, any suitable media that is fleeting and devoid of any semblance of permanence during transmission, and/or any suitable intangible media.

Although the above disclosure discusses through various examples what is currently considered to be a variety of useful embodiments of the disclosure, it is to be understood that such detail is solely for that purpose, and that the present disclosure is not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for image processing, comprising:
at least one computer-readable storage medium including a set of instructions for processing an image; and
at least one processor in communication with the computer-readable storage medium, wherein when executing the set of instructions, the at least one processor is directed to:
identify a target region in the image, the target region having a plurality of gray levels;
determine a plurality of statistical probabilities relating to the plurality of gray levels, a statistical probability relating to a gray level of the plurality of gray levels and being represented as a cumulative histogram of the gray level;
for each of the plurality of statistical probabilities,
determine an initial coefficient associated with the statistical probability based on the gray level associated with the statistical probability;
determine whether a gray level corresponding to the initial coefficient is less than a threshold; and
determine an optimal coefficient associated with the statistical probability based at least on a determination result of whether the gray level corresponding to the initial coefficient is less than the threshold;
determine a mapping curve of the target region based on a plurality of optimal coefficients associated with the plurality of statistical probabilities;
identify at least one pixel that needs to be processed in the target region;

for a pixel of the at least one pixel that needs to be processed, determine the value of the pixel based on the mapping curve of the target region; and generate a processed image based on the determined at least one value of the at least one pixel.

2. The system of claim 1, wherein to determine the mapping curve of the target region based on the plurality of optimal coefficients associated with the plurality of statistical probabilities, the at least one processor is further directed to:

determine a plurality of optimal curves, an optimal curve being associated with an optimal coefficient of the plurality of optimal coefficients; and determine the mapping curve of the target region based on the plurality of optimal curves and a plurality of predetermined curves.

3. The system of claim 1, wherein to determine the initial coefficient associated with the statistical probability, the at least one processor is further directed to:

identify a central pixel of the target region; and determine the gray level corresponding to the initial coefficient based on the central pixel of the target region.

4. The system of claim 2, wherein to determine the mapping curve of the target region based on the plurality of optimal curves and the plurality of predetermined curves, the at least one processor is further directed to:

for a gray level of the plurality of gray levels in the target region, determine a sub mapping curve associated with the gray level based on an optimal curve associated with the gray level and a predetermined curve associated with the gray level; and determine the mapping curve of the target region based on the plurality of the sub mapping curves associated with the plurality of gray levels.

5. The system of claim 4, wherein the image includes at least one target region.

* * * * *